(12) United States Patent
Cuevas et al.

(10) Patent No.: US 12,478,069 B2
(45) Date of Patent: Nov. 25, 2025

(54) **COMPOSITION COMPRISING BIOFILM FORMING *BACILLUS***

(71) Applicant: Chr. Hansen A/S, Hoersholm (DK)

(72) Inventors: Patricia Dominguez Cuevas, Hoersholm (DK); Rute Neves, Hoersholm (DK); Raquel Azevedo, Hoersholm (DK); Lars Moelbak, Hoersholm (DK); Lorenzo Fimognari, Hoersholm (DK)

(73) Assignee: Chr. Hansen A/S, Hoershlom (DK)

( * ) Notice: Subject to any disclaimer, the term of this patent is extended or adjusted under 35 U.S.C. 154(b) by 958 days.

(21) Appl. No.: 17/613,902

(22) PCT Filed: May 28, 2020

(86) PCT No.: PCT/EP2020/064892
§ 371 (c)(1),
(2) Date: Nov. 23, 2021

(87) PCT Pub. No.: WO2020/239936
PCT Pub. Date: Dec. 3, 2020

(65) Prior Publication Data
US 2022/0264893 A1  Aug. 25, 2022

(30) Foreign Application Priority Data
May 29, 2019 (EP) .................... 19177378

(51) Int. Cl.
*A01N 63/22* (2020.01)
*C12N 1/20* (2006.01)
*C12N 1/36* (2006.01)
*C12R 1/07* (2006.01)

(52) U.S. Cl.
CPC ............. *A01N 63/22* (2020.01); *C12N 1/205* (2021.05); *C12N 1/36* (2013.01); *C12R 2001/07* (2021.05)

(58) Field of Classification Search
None
See application file for complete search history.

(56) References Cited

FOREIGN PATENT DOCUMENTS

WO   WO-2012/087980   6/2012

OTHER PUBLICATIONS

Du et al., "Comparative genomic analysis of *Bacillus paralicheniformis* MDJK30 with its closely related species reveals an evolutionary relationship between *B. paralicheniformis* and *B. licheniformis*," vol. 20, No. 283, pp. 1-16 (Apr. 2019).
Gao et al., "Functional Characterization of Core Components of the Bacillus subtilis Cyclic-Di-GMP Signaling Pathway," Journal of Bacteriology, vol. 195, No. 21, pp. 4782-4792 (Nov. 2013).
Pylro et al., "Closed Genome Sequence of *Bacillus paralicheniformis* Strain CBMAI 1303, a Bacterium Applied for Phytopathogen Biocontrol," Microbiology Resource Announcements, vol. 8, Issue 3, e01507-18, pp. 1-2 (Jan. 2019).
Serra et al., "A c-di-GMP-Based Switch Controls Local Heterogeneity of Extracellular Matrix Synthesis which is Crucial for Integrity and Morphogenesis of *Escherichia coli* Macrocolony Biofilms," Journal of Molecular Biology, vol. 431, pp. 4775-4793 (Nov. 2019).
Yang et al., "C-di-GMP turnover influences motility and biofilm formation in Bacillus amyloliquefaciens PG12," Research in Microbiology, vol. 169, pp. 205-2013 (avail online Jun. 2018).

*Primary Examiner* — Marsha Tsay
(74) *Attorney, Agent, or Firm* — Adam Rucker

(57) ABSTRACT

Present invention relates to new strains of *Bacillus paralicheniformis* with improved ability to form biofilm and colonize the rhizosphere when compared to their parental strains from where they are derived.

23 Claims, 11 Drawing Sheets
Specification includes a Sequence Listing.

SEQUENCE LISTING

<160> NUMBER OF SEQ ID NOS: 8

<210> SEQ ID NO 1
<211> LENGTH: 1200
<212> TYPE: DNA
<213> ORGANISM: Bacillus paralicheniformis

<400> SEQUENCE: 1

```
atgagggtat tcgttgccag acagccaata ttcaacagaa agaacaagt tgtcgcatac      60
gagcttttat acagagaaag cgagaaaaac ttttttttccg gtattgacgg tgatcaagcg    120
acaacagaat tgatgattaa cagcttttta aacattggaa tcgataaatt gacagaaggc    180
aaaaggtatt acgtgaattt taccgaaggt cttttggcat cagggctgcc gacttatttt    240
gatccggacc agctcgttgt agaaatcctt gaagatgtgc cgatcacccc tgagcttatc    300
gaaaggtgca ggcatttgaa aagcctcggc tacacgattg cccttgatga ttttgtttta    360
aaacatcgcg tggagaggga cttgctccat cagcttttgg catccattga tattttgaag    420
atcgattttt tcaaaacgac gcggcaggaa agacagagca tccttcgatc atgccggaac    480
caccgtctga cgtttctcgc tgaaaaagtg gagacgcgaa aggattatga gcaggcggca    540
aaagacggat tcaactgtt tcaaggctat ttcttcagcg agcccgctgt gattgacggt    600
caggacatta catatcattt ccatgcttac tatgagctgc tgcatgaatt aagcgaagat    660
cagcctgata ttgaaaacgt cacaaatatt atagaacgcg atttgtcgct ttcctaccag    720
ctgctgaagc tgttgaactc tccggccaac cggccgattc aaaagattaa aagcatccgc    780
caggctatcg tgcttctcgg atttaaagaa atcaaaaggt ggatcttcat cctctcattt    840
aaggatttaa cgaaaaaaca aaactccagc aagaacgaag tcgtcaagat ttcgctgatc    900
cgcgcgaagc tttgcgaatt gctggcgaaa aaacgaatc gccctcagcc ggcttcttat    960
atgctgacag gcatgttttc atttatcgat acactgcttc acaagaact ggcggaagtc   1020
atcagcgaac tgccgctgac ggacgaagta ggacaagcac tgctcggcaa agaaaacgat   1080
tatcgaaaaa tcttacggct tgcaaaatcg atcgagcgaa acgaatggga agacagcacg   1140
ccagaaacag aaggcttaac aaaagatgaa gcgtatcaat gctatcttga agccgttgat   1200
```

<210> SEQ ID NO 2
<211> LENGTH: 406
<212> TYPE: PRT
<213> ORGANISM: Bacillus paralicheniformis

<400> SEQUENCE: 2

```
Met Arg Val Phe Val Ala Arg Gln Pro Ile Phe Asn Arg Lys Glu Gln
1               5                   10                  15

Val Val Ala Tyr Glu Leu Leu Tyr Arg Glu Ser Glu Lys Asn Phe Phe
            20                  25                  30

Ser Gly Ile Asp Gly Asp Gln Ala Thr Thr Glu Leu Met Ile Asn Ser
        35                  40                  45

Phe Leu Asn Ile Gly Ile Asp Lys Leu Thr Glu Gly Lys Arg Tyr Tyr
    50                  55                  60

Val Asn Phe Thr Glu Gly Leu Leu Ala Ser Gly Leu Pro Thr Tyr Phe
65                  70                  75                  80

Asp Pro Asp Gln Leu Val Val Glu Ile Leu Glu Asp Val Pro Ile Thr
                85                  90                  95
```

```
Pro Glu Leu Ile Glu Arg Cys Arg His Leu Lys Ser Leu Gly Tyr Thr
            100                 105                 110
Ile Ala Leu Asp Asp Phe Cys Leu Lys His Arg Val Glu Arg Asp Leu
        115                 120                 125
Leu His Gln Leu Leu Ala Ser Ile Asp Ile Leu Lys Ile Asp Phe Phe
    130                 135                 140
Lys Thr Thr Arg Gln Glu Arg Gln Ser Ile Leu Arg Ser Cys Arg Asn
145                 150                 155                 160
His Arg Leu Thr Phe Leu Ala Glu Lys Val Glu Thr Arg Lys Asp Tyr
                165                 170                 175
Glu Gln Ala Ala Lys Asp Gly Phe Gln Leu Phe Gln Gly Tyr Phe Phe
            180                 185                 190
Ser Glu Pro Ala Val Ile Asp Gly Gln Asp Ile Thr Tyr His Phe His
        195                 200                 205
Ala Tyr Tyr Glu Leu Leu His Glu Leu Ser Glu Asp Gln Pro Asp Ile
    210                 215                 220
Glu Asn Val Thr Asn Ile Ile Glu Arg Asp Leu Ser Leu Ser Tyr Gln
225                 230                 235                 240
Leu Leu Lys Leu Leu Asn Ser Pro Ala Asn Arg Pro Ile Gln Lys Ile
                245                 250                 255
Lys Ser Ile Arg Gln Ala Ile Val Leu Leu Gly Phe Lys Glu Ile Lys
            260                 265                 270
Arg Trp Ile Phe Ile Leu Ser Phe Lys Asp Leu Thr Lys Lys Gln Asn
        275                 280                 285
Ser Ser Lys Asn Glu Val Val Lys Ile Ser Leu Ile Arg Ala Lys Leu
    290                 295                 300
Cys Glu Leu Leu Ala Lys Lys Thr Asn Arg Pro Gln Pro Ala Ser Tyr
305                 310                 315                 320
Met Leu Thr Gly Met Phe Ser Phe Ile Asp Thr Leu Leu His Lys Glu
                325                 330                 335
Leu Ala Glu Val Ile Ser Glu Leu Pro Leu Thr Asp Glu Val Gly Gln
            340                 345                 350
Ala Leu Leu Gly Lys Glu Asn Asp Tyr Arg Lys Ile Leu Arg Leu Ala
        355                 360                 365
Lys Ser Ile Glu Arg Asn Glu Trp Glu Asp Ser Thr Pro Glu Thr Glu
    370                 375                 380
Gly Leu Thr Lys Asp Glu Ala Tyr Gln Cys Tyr Leu Glu Ala Val Asp
385                 390                 395                 400
Trp Cys Gln Lys Leu Leu
                405

<210> SEQ ID NO 3
<211> LENGTH: 1644
<212> TYPE: DNA
<213> ORGANISM: Bacillus licheniformis

<400> SEQUENCE: 3
atgaataaac gcaaaacagg attttcaatt ttaagcttgc tgctgatctt atcgattttt      60
ctaacggcct gcaacagcgg cgaagtcgga ggggacgaaa aggaaggcaa atctgacggg     120
aagccgcagc agggcgggga tctgattgct ggatccacag gtgaaccgac gctgtttaat     180
tcactgtatt caactgatac agcaagttca gatattgaaa gactgatcta caacactttg     240
ttagacgtta atgagaaact tgaagtggag aaccagcttg ctgaggaagt aaaagaatcg     300
gaagatggtt taacatttga tgttaagctc aaggaaggcg tcaagtttca tgacggtgaa     360
```

```
gaaatgacag ctgatgatgt tgtatttact tacagcattc cgatgagtga tgactacgtc    420
ggagaacgcg gctcgaactt taaaatgata gagtctgtca cgaaaaaagg taaatatgaa    480
gtacagttta aattaaagaa gcctgatccg tattttttaca atgttacact tgccagttac   540
ggtattctgc ctaagcacat tttaaaagat gtcccaatca gcaaactcgg tgaacacgaa    600
ttcaatcgaa agaatccgat tggaacagga ccgtttaaat ttaaagaatg gaagaagga     660 caatatgtaa aggttgaggc ttttgatgat tattatgccg ggcgtcctca tttagattcg    720
atcacgtata aaattattcc ggattcaaat gcagcgctgt cacagctgca agctggagat    780
gtcgattact tggtcgttac accaggacca gactataaaa cggccgagaa atttaacaat    840
gtgaagatgg aaaccgattt aggtttgaat tatacgtata tcggctggaa cgaaagaaat    900
gagctgttta aggataaaaa ggttcgccaa gcgctgacac atgcgcttga ccgccaggcg    960
ctcgttgacc aagttctaga tggagatggg gaaatcgcga acatcccgga aagcccgctt    1020
tcatggaact atccggataa caagataag tttaaaacgt ttgaatacga tccagagaaa     1080
gcaaaaaaac tgctcaaaga agctggatgg acagactcag atggtgatgg gattttagat    1140
aaggacggca aaagttttc tttcgttatt aaaacgaacc aaggaaacaa acacgtgaa      1200 gacctcgcgg ttgttgttca gcaacaatta aaagaaattg gtattcaagc aaaaccgcag    1260
attgttgaat ggagtgcttt aattgaacaa atgaatccgc cgaattggga ttttgatgcg    1320
atgatcatgg gctggagcct tgctacgttc cctgatcaga gcaacatttt ccattcgaaa    1380
gaagctgaaa aaggactaaa ctatgtttgg tatcaaaata aaaagcttga taaattgctg    1440
gatgaagcta aaacgttgaa ggatcgtgaa gaatataaaa aggcgtatga agatatttac    1500
gaaattctgg cggaagatca gccatataca ttcttgtatt atacgaacta ccatagagcg    1560
atgccaaaaa atatgaaagg ttacgtcttc catccgaaag aagatttcta taagccgaa     1620 gactggtggc tggatcaaaa ataa                                           1644

<210> SEQ ID NO 4
<211> LENGTH: 547
<212> TYPE: PRT
<213> ORGANISM: Bacillus licheniformis

<400> SEQUENCE: 4

Met Asn Lys Arg Lys Thr Gly Phe Ser Ile Leu Ser Leu Leu Leu Ile
1               5                   10                  15

Leu Ser Ile Phe Leu Thr Ala Cys Asn Ser Gly Glu Val Gly Gly Asp
            20                  25                  30

Glu Lys Glu Gly Lys Ser Asp Gly Lys Pro Gln Gln Gly Gly Asp Leu
        35                  40                  45

Ile Ala Gly Ser Thr Gly Glu Pro Thr Leu Phe Asn Ser Leu Tyr Ser
    50                  55                  60

Thr Asp Thr Ala Ser Ser Asp Ile Glu Arg Leu Ile Tyr Asn Thr Leu
65                  70                  75                  80

Leu Asp Val Asn Glu Lys Leu Glu Val Glu Asn Gln Leu Ala Glu Glu
                85                  90                  95

Val Lys Glu Ser Glu Asp Gly Leu Thr Phe Asp Val Lys Leu Lys Glu
            100                 105                 110

Gly Val Lys Phe His Asp Gly Glu Glu Met Thr Ala Asp Asp Val Val
        115                 120                 125

Phe Thr Tyr Ser Ile Pro Met Ser Asp Asp Tyr Val Gly Glu Arg Gly
    130                 135                 140
```

```
Ser Asn Phe Lys Met Ile Glu Ser Val Thr Lys Lys Gly Lys Tyr Glu
145                 150                 155                 160

Val Gln Phe Lys Leu Lys Lys Pro Asp Pro Tyr Phe Tyr Asn Val Thr
                165                 170                 175

Leu Ala Ser Tyr Gly Ile Leu Pro Lys His Ile Leu Lys Asp Val Pro
            180                 185                 190

Ile Ser Lys Leu Gly Glu His Glu Phe Asn Arg Lys Asn Pro Ile Gly
                195                 200                 205

Thr Gly Pro Phe Lys Phe Lys Glu Trp Lys Glu Gly Gln Tyr Val Lys
        210                 215                 220

Val Glu Ala Phe Asp Asp Tyr Ala Gly Arg Pro His Leu Asp Ser
225                 230                 235                 240

Ile Thr Tyr Lys Ile Ile Pro Asp Ser Asn Ala Ala Leu Ser Gln Leu
                245                 250                 255

Gln Ala Gly Asp Val Asp Tyr Leu Val Val Thr Pro Gly Pro Asp Tyr
            260                 265                 270

Lys Thr Ala Glu Lys Phe Asn Asn Val Lys Met Glu Thr Asp Leu Gly
        275                 280                 285

Leu Asn Tyr Thr Tyr Ile Gly Trp Asn Glu Arg Asn Glu Leu Phe Lys
        290                 295                 300

Asp Lys Lys Val Arg Gln Ala Leu Thr His Ala Leu Asp Arg Gln Ala
305                 310                 315                 320

Leu Val Asp Gln Val Leu Asp Gly Asp Gly Glu Ile Ala Asn Ile Pro
                325                 330                 335

Glu Ser Pro Leu Ser Trp Asn Tyr Pro Asp Asn Lys Asp Lys Phe Lys
            340                 345                 350

Thr Phe Glu Tyr Asp Pro Glu Lys Ala Lys Lys Leu Leu Lys Glu Ala
        355                 360                 365

Gly Trp Thr Asp Ser Asp Gly Asp Gly Ile Leu Asp Lys Asp Gly Lys
    370                 375                 380

Lys Phe Ser Phe Val Ile Lys Thr Asn Gln Gly Asn Lys Thr Arg Glu
385                 390                 395                 400

Asp Leu Ala Val Val Gln Gln Gln Leu Lys Glu Ile Gly Ile Gln
                405                 410                 415

Ala Lys Pro Gln Ile Val Glu Trp Ser Ala Leu Ile Glu Gln Met Asn
                420                 425                 430

Pro Pro Asn Trp Asp Phe Asp Ala Met Ile Met Gly Trp Ser Leu Ala
        435                 440                 445

Thr Phe Pro Asp Gln Ser Asn Ile Phe His Ser Lys Glu Ala Glu Lys
        450                 455                 460

Gly Leu Asn Tyr Val Trp Tyr Gln Asn Lys Lys Leu Asp Lys Leu Leu
465                 470                 475                 480

Asp Glu Ala Lys Thr Leu Lys Asp Arg Glu Glu Tyr Lys Lys Ala Tyr
            485                 490                 495

Glu Asp Ile Tyr Glu Ile Leu Ala Glu Asp Gln Pro Tyr Thr Phe Leu
            500                 505                 510

Tyr Tyr Thr Asn Tyr His Arg Ala Met Pro Lys Asn Met Lys Gly Tyr
        515                 520                 525

Val Phe His Pro Lys Glu Asp Phe Tyr Lys Ala Glu Asp Trp Trp Leu
        530                 535                 540

Asp Gln Lys
545
```

<210> SEQ ID NO 5
<211> LENGTH: 1389
<212> TYPE: DNA
<213> ORGANISM: Bacillus paralicheniformis

<400> SEQUENCE: 5

| | | | | | |
|---|---|---|---|---|---|
| atgccagtca | attcgtttga | caactatcca | atgtcttgga | aacctgataa | gaaagcattg | 60 |
| aagcgtcctt | attattattc | gattgcgaca | ttgcttgaag | aggatatcgt | aaacggtttt | 120 |
| ttggcgcctg | gacaaagct | gcctccgcaa | cgggaactgg | cagattttct | tgatttaaac | 180 |
| tttaccacga | ttacacgcgc | ctacaaacta | tgtgagttca | aggggctgat | ttatgctgtc | 240 |
| accggaagcg | gcaccttcgt | cgctcctaat | gctgcccgct | ctatcaccat | ttccgcagat | 300 |
| aaggtgacaa | actgcattga | tctcggattt | gtagcctctt | ttgagcaaac | caacggaatg | 360 |
| gtagcggagg | ttgttcaaaa | agctgcagat | aaaagctatt | ggagaagct | aatggactac | 420 |
| aatgacccga | ctggtattcc | gcatcaaaaa | acggcagggc | taaactggat | ggaatctttc | 480 |
| ggtattcacg | cagaccaaga | acatattgcg | attgtttccg | gtgctcaaaa | tgcgttggcc | 540 |
| attgcattga | cctcgctgtt | tgaccctggt | gaccgcattg | caactgacct | atacacgtat | 600 |
| tcgaactta | ttgagctggc | caaaatgctc | catattcaat | ggtacctgt | ttccggtgac | 660 |
| cagtatggaa | tgctgccgga | tgaacttgaa | aagcagtgct | gccagacgaa | aattcacggc | 720 |
| atatttctga | tgccctcatg | ctgtaatccg | acaaccgtga | tgtatcaga | tgttcgaaag | 780 |
| catgaattag | tggaggccat | ccgcaagcat | gatttgctgt | tgatcgagga | tgatattcat | 840 |
| gcgtttctga | cggcagggat | tgtatcagat | tatcagcagc | caatgtttag | tttgcttcca | 900 |
| gatcagagca | tatacatttg | cagcacctca | agtcgatat | gctccgggtt | aagagttgcc | 960 |
| tatatggtgt | atggggatgc | tttacgggaa | agatattgc | agggcatttt | taacatcaat | 1020 |
| gtcaaaacgt | catctttaga | tgcggaggtc | attactgagc | tgattttatc | aggtaaggct | 1080 |
| catgaaatcg | ttgctcaaaa | gaaaaagctt | gcacagtcgg | ccaatgatct | ttatgcggca | 1140 |
| tattttcctg | taactgagcc | tggtgaacat | cctcttagtt | tataccgatg | gcttccgatt | 1200 |
| gaagagcatg | ctgactcatc | acaattggag | acggatttga | ggaagcgtgg | gattcgggtt | 1260 |
| tttcattccg | accgttttct | cagcgggcag | acgacgcgcg | aaaaatattt | gcgcattgcg | 1320 |
| ctttcttcta | caaattcatt | agatgagctg | aaattagggt | tggatatatt | aaaacagtat | 1380 |
| ctcggataa | | | | | | 1389 |

<210> SEQ ID NO 6
<211> LENGTH: 462
<212> TYPE: PRT
<213> ORGANISM: Bacillus paralicheniformis

<400> SEQUENCE: 6

Met Pro Val Asn Ser Phe Asp Asn Tyr Pro Met Ser Trp Lys Pro Asp
1               5                   10                  15

Lys Lys Ala Leu Lys Arg Pro Tyr Tyr Tyr Ser Ile Ala Thr Leu Leu
            20                  25                  30

Glu Glu Asp Ile Val Asn Gly Phe Leu Ala Pro Gly Thr Lys Leu Pro
        35                  40                  45

Pro Gln Arg Glu Leu Ala Asp Phe Leu Asp Leu Asn Phe Thr Thr Ile
    50                  55                  60

Thr Arg Ala Tyr Lys Leu Cys Glu Phe Lys Gly Leu Ile Tyr Ala Val
65                  70                  75                  80

Thr Gly Ser Gly Thr Phe Val Ala Pro Asn Ala Ala Arg Ser Ile Thr
                 85                  90                  95

Ile Ser Ala Asp Lys Val Thr Asn Cys Ile Asp Leu Gly Phe Val Ala
            100                 105                 110

Ser Phe Glu Gln Thr Asn Gly Met Val Ala Glu Val Val Gln Lys Ala
        115                 120                 125

Ala Asp Lys Ser Tyr Leu Glu Lys Leu Met Asp Tyr Asn Asp Pro Thr
    130                 135                 140

Gly Ile Pro His Gln Lys Thr Ala Gly Leu Asn Trp Met Glu Ser Phe
145                 150                 155                 160

Gly Ile His Ala Asp Gln Glu His Ile Ala Ile Val Ser Gly Ala Gln
        165                 170                 175

Asn Ala Leu Ala Ile Ala Leu Thr Ser Leu Phe Asp Pro Gly Asp Arg
            180                 185                 190

Ile Ala Thr Asp Leu Tyr Thr Tyr Ser Asn Phe Ile Glu Leu Ala Lys
        195                 200                 205

Met Leu His Ile Gln Leu Val Pro Val Ser Gly Asp Gln Tyr Gly Met
    210                 215                 220

Leu Pro Asp Glu Leu Glu Lys Gln Cys Cys Gln Thr Lys Ile His Gly
225                 230                 235                 240

Ile Phe Leu Met Pro Ser Cys Cys Asn Pro Thr Thr Val Met Ile Ser
            245                 250                 255

Asp Val Arg Lys His Glu Leu Val Glu Ala Ile Arg Lys His Asp Leu
        260                 265                 270

Leu Leu Ile Glu Asp Asp Ile His Ala Phe Leu Thr Ala Gly Ile Val
    275                 280                 285

Ser Asp Tyr Gln Gln Pro Met Phe Ser Leu Leu Pro Asp Gln Ser Ile
    290                 295                 300

Tyr Ile Cys Ser Thr Ser Lys Ser Ile Cys Ser Gly Leu Arg Val Ala
305                 310                 315                 320

Tyr Met Val Tyr Gly Asp Ala Leu Arg Glu Lys Ile Leu Gln Gly Ile
            325                 330                 335

Phe Asn Ile Asn Val Lys Thr Ser Ser Leu Asp Ala Glu Val Ile Thr
        340                 345                 350

Glu Leu Ile Leu Ser Gly Lys Ala His Glu Ile Val Ala Gln Lys Lys
    355                 360                 365

Lys Leu Ala Gln Ser Ala Asn Asp Leu Tyr Ala Ala Tyr Phe Pro Val
    370                 375                 380

Thr Glu Pro Gly Glu His Pro Leu Ser Leu Tyr Arg Trp Leu Pro Ile
385                 390                 395                 400

Glu Glu His Ala Asp Ser Ser Gln Leu Glu Thr Asp Leu Arg Lys Arg
            405                 410                 415

Gly Ile Arg Val Phe His Ser Asp Arg Phe Leu Ser Gly Gln Thr Thr
        420                 425                 430

Arg Glu Lys Tyr Leu Arg Ile Ala Leu Ser Ser Thr Asn Ser Leu Asp
    435                 440                 445

Glu Leu Lys Leu Gly Leu Asp Ile Leu Lys Gln Tyr Leu Gly
    450                 455                 460

<210> SEQ ID NO 7
<211> LENGTH: 1626
<212> TYPE: DNA
<213> ORGANISM: Bacillus paralicheniformis

<400> SEQUENCE: 7

-continued

```
ttgaagaagc gtttgtcatt tatcagttta atgctcattt tcacactcgt cctcagcgcc    60
tgcggcttcg gctcaagctc cggtgacggc ggtaaaaaag acagcaaagg gaaagacaca   120
ttaaatgtca acattaaaac agaaccgttt tcactacatc cgggactcgc aaacgattcg   180
gtgtctgcaa acgtgcttcg tcagactttt gaaggattga cgacaatcgg taaagatgga   240
aagccggttg aagcggcagc cgaaaaaatc gaagtcagcg acgaccaaaa aacatacaca   300
ttcacgctcc gcgacgcgaa atggtcaaat ggagatcctg taacagcaga ggattttgaa   360
tacgcatgga atgggcgct cgaccctaaa aacgaatcgc aatatgcgta tcagctttac   420
tacttaaaag gcgagaagc agcgaacacc ggcaaaggga aaattgaaga tgtcggcgtt   480
aaagctgtta atgataagac tttaaaagtc gagcttgaaa accgacacc gtattttact   540
gaactgacag cattctacac atatatgcca gtcaataaaa aggtagcaga agaatgcg   600
aaatggtaca caaacgcaga tgagaactac gtatctaacg gacctttcaa atggcgaaa   660
tggaagcaca gcgaaacat cgtactggag aaaaacgacc agtactggga taagacgct   720
gttaagctga agaaaatcaa tatggcgatg gtcaacgatc cgaacactgg tctgaacatg   780
tacaaaaaag gcgagctaga ctttgtagga cagccgcttg accagatttc aacggatgcg   840
attccaagcc tgaaaaaga aggcctgaac attgatccgt tcgcatcggt ttacctgtac   900
aaattcaaca ctgaagcggc tccgctgaac aatgtcaaca tccgtaaggc gctgacatac   960
gcgatcaacc gcgaagcgat cgtcaaaaac atcacgcaag cggaacagct gcctgcgatg  1020
ggattagtgc cgccggcagt ccacggcttt gagtcaaata aaggctattt caaagaccat  1080
gatgttgata aggcgaaaga atacttggaa aaaggtttga aagagctcgg tttgaaaaaa  1140
gcgtcagacc ttccgaaaat cacgctttcc ttcaacacgg atgaagcaca ccaaaaaatc  1200
gctcaagccg ttcaggaaat gtggaacaag gaactgggct tagatgtcga attaggcaat  1260
gaagaatgga acgtatacat cgataagctc catgcaggaa actatcaaat cggccgttta  1320
ggctggaccg ccgactttaa cgacggaatg aacttccttg aaacataccg cgacaaagaa  1380
ggcgaaaaca atgatacgaa ctgggaaaac gcaaagtata agagctgct gaataaagca  1440
tcgagagaaa ctgattcagc gaaacgcatc gagctgatga agaagcaga aagcatcatc  1500
atggatgagc tgccggttgc accgatctac ttctacacaa tgccgtatct tcatgatgaa  1560
agcttaaaag actttgttct aactggtact ggtgagatct atttcaaaac cgcgcatttt  1620
gaataa                                                             1626
```

<210> SEQ ID NO 8
<211> LENGTH: 541
<212> TYPE: PRT
<213> ORGANISM: Bacillus paralicheniformis

<400> SEQUENCE: 8

```
Met Lys Lys Arg Leu Ser Phe Ile Ser Leu Met Leu Ile Phe Thr Leu
1               5                   10                  15

Val Leu Ser Ala Cys Gly Phe Gly Ser Ser Ser Gly Asp Gly Gly Lys
                20                  25                  30

Lys Asp Ser Lys Gly Lys Asp Thr Leu Asn Val Asn Ile Lys Thr Glu
            35                  40                  45

Pro Phe Ser Leu His Pro Gly Leu Ala Asn Asp Ser Val Ser Ala Asn
        50                  55                  60

Val Leu Arg Gln Thr Phe Glu Gly Leu Thr Thr Ile Gly Lys Asp Gly
65                  70                  75                  80
```

```
Lys Pro Val Glu Ala Ala Glu Lys Ile Glu Val Ser Asp Asp Gln
                85                  90                  95

Lys Thr Tyr Thr Phe Thr Leu Arg Asp Ala Lys Trp Ser Asn Gly Asp
            100                 105                 110

Pro Val Thr Ala Glu Asp Phe Glu Tyr Ala Trp Lys Trp Ala Leu Asp
            115                 120                 125

Pro Lys Asn Glu Ser Gln Tyr Ala Tyr Gln Leu Tyr Tyr Leu Lys Gly
            130                 135                 140

Gly Glu Ala Ala Asn Thr Gly Lys Gly Lys Ile Glu Asp Val Gly Val
145                 150                 155                 160

Lys Ala Val Asn Asp Lys Thr Leu Lys Val Glu Leu Glu Lys Pro Thr
                165                 170                 175

Pro Tyr Phe Thr Glu Leu Thr Ala Phe Tyr Thr Tyr Met Pro Val Asn
            180                 185                 190

Lys Lys Val Ala Glu Lys Asn Ala Lys Trp Tyr Thr Asn Ala Asp Glu
            195                 200                 205

Asn Tyr Val Ser Asn Gly Pro Phe Lys Met Ala Lys Trp Lys His Ser
            210                 215                 220

Gly Asn Ile Val Leu Glu Lys Asn Asp Gln Tyr Trp Asp Lys Asp Ala
225                 230                 235                 240

Val Lys Leu Lys Lys Ile Asn Met Ala Met Val Asn Asp Pro Asn Thr
                245                 250                 255

Gly Leu Asn Met Tyr Lys Lys Gly Glu Leu Asp Phe Val Gly Gln Pro
            260                 265                 270

Leu Asp Gln Ile Ser Thr Asp Ala Ile Pro Ser Leu Lys Lys Glu Gly
            275                 280                 285

Leu Asn Ile Asp Pro Phe Ala Ser Val Tyr Leu Tyr Lys Phe Asn Thr
            290                 295                 300

Glu Ala Ala Pro Leu Asn Asn Val Asn Ile Arg Lys Ala Leu Thr Tyr
305                 310                 315                 320

Ala Ile Asn Arg Glu Ala Ile Val Lys Asn Ile Thr Gln Ala Glu Gln
                325                 330                 335

Leu Pro Ala Met Gly Leu Val Pro Pro Ala Val His Gly Phe Glu Ser
            340                 345                 350

Asn Lys Gly Tyr Phe Lys Asp His Asp Val Asp Lys Ala Lys Glu Tyr
            355                 360                 365

Leu Glu Lys Gly Leu Lys Glu Leu Gly Leu Lys Ala Ser Asp Leu
            370                 375                 380

Pro Lys Ile Thr Leu Ser Phe Asn Thr Asp Glu Ala His Gln Lys Ile
385                 390                 395                 400

Ala Gln Ala Val Gln Glu Met Trp Asn Lys Glu Leu Gly Leu Asp Val
                405                 410                 415

Glu Leu Gly Asn Glu Glu Trp Asn Val Tyr Ile Asp Lys Leu His Ala
            420                 425                 430

Gly Asn Tyr Gln Ile Gly Arg Leu Gly Trp Thr Ala Asp Phe Asn Asp
            435                 440                 445

Gly Met Asn Phe Leu Glu Thr Tyr Arg Asp Lys Glu Gly Gly Asn Asn
450                 455                 460

Asp Thr Asn Trp Glu Asn Ala Lys Tyr Lys Glu Leu Leu Asn Lys Ala
465                 470                 475                 480

Ser Arg Glu Thr Asp Ser Ala Lys Arg Ile Glu Leu Met Lys Glu Ala
                485                 490                 495
```

-continued

```
Glu Ser Ile Ile Met Asp Glu Leu Pro Val Ala Pro Ile Tyr Phe Tyr
            500             505             510

Thr Met Pro Tyr Leu His Asp Glu Ser Leu Lys Asp Phe Val Leu Thr
        515             520             525

Gly Thr Gly Glu Ile Tyr Phe Lys Thr Ala His Phe Glu
    530             535             540
```

COMPOSITION COMPRISING BIOFILM FORMING *BACILLUS*

CROSS-REFERENCE TO RELATED APPLICATIONS

The present application is the U.S. National Stage of International Application No. PCT/EP2020/064892, filed May 28, 2020, and claims priority to European Patent Application No. 19177378.7, filed May 29, 2019.

SUMMARY OF THE INVENTION

The present invention relates to a composition comprising Bacilli, *Bacillus paralicheniformis* and *Bacillus licheniformis* with improved biofilm forming properties on plants and/or its habitat, to its use, to a process for its preparation, to the use of Bacilli, *Bacillus paralicheniformis* and *Bacillus licheniformis* with improved biofilm forming properties for controlling, combating and/or conferring specific resistance to plant pests. Particularly, the invention relates to strains of Bacilli not expressing functional proteins encoded by one or more of the genes GntR, OppA, PdeH.

The inventors of present invention have selected derivative strains that show an increase in pellicle biofilm formation and differential colony structure. The derivative strains were selected after carrying out an adaptive laboratory evolution campaign. Genotypic variations associated with the phenotypic changes were detected and derivative strains have been tested in plant experimental systems and proven to promote increased plant growth as compared to the original (parental) strain.

Present disclosure explains how the genetic modifications have altered biosynthesis levels of biofilm components and how this promotes bioactivity of bioprotective *Bacillus* strains.

FIELD OF THE INVENTION

In the current context of a modern and ecologic society, which is concerned with preserving the environment, biological control is considered an attractive alternative or supplement to conventional methods of control. Biological control is the use of one organism (predator, parasite or pathogen) that attacks another organism which is causing economic damage to crops. This is a very common strategy in agro ecological systems, as well as in conventional agriculture which relies on the Integrated Pest Management (IPM).

Although the biological control brings positive effects in the reduction or withdrawal of pesticide use and improving farmers' income, an analysis of the set of experiments worldwide, shows that the results are still concentrated in only a few crops. There is still much to develop in areas of control of pests and diseases.

There has been a great emphasis on research on biological control with the use of bacteria colonizing the roots of plants, called rhizobacteria. The beneficial rhizobacteria for promoting growth and/or acting in the biological control of plant pathogenic bacteria are called plant growth-promoting rhizobacteria or PGPR.

One of the key factors for successful biological control by PGPR is successful colonization of the habitat e.g. by biofilm formation. Hence successful biofilm formation may increase the protective effect of the PGPR.

STATE OF THE ART

The pressure of society to replace the chemicals with environmentally acceptable products or ecological techniques has encouraged the search for alternative methods to promote plant health. In this context, biological control has been considered one of the alternatives within an integrated approach, in which one seeks to ensure sustainable development of agriculture.

The risks to humans and environments presented by using synthetic pesticides emphasize the need for tools such as biological control in optimizing sustainable agricultural systems.

Based on the idea that improved biofilm formation may improve the bioprotective effect of Bacilli, the inventors of present invention have selected derivative strains of Bacilli that show an increase in pellicle biofilm formation and differential colony structure.

To the best of our knowledge specific genetic features linked to improved biofilm formation and associated mode of actions have never been described for Bacilli and in particular not for *B. paralicheniformis* strains.

The function of the gene PdeH as c-di-GMP phosphodiesterase controlling c-di-GMP intracellular levels has been described previously in laboratory strains of *B. subtilis*, *B. amyloliquefaciens* and *B. cereus* by e.g. Kampf J, Stülke J. (2017). No studies have been done in *B. licheniformis* or *B. paralicheniformis* strains.

The functional role of GntR regulator is unknown. Therefore, investigating the molecular mechanism by which it generates more robust biofilms will constitute an undescribed mode of action and a contribution to the scientific field.

BRIEF DESCRIPTION OF THE DRAWINGS

FIG. 2—Selected improved biofilm derivatives and biofilm quantification. FIG. 2B. Corresponds to measured absorbance values at 570 nm obtained after crystal violet biofilm staining. Error bars indicate standard deviation between duplicates. FIG. 2C. Corresponds to measured absorbance values at 504 nm obtained after 5 and 6 h pellicles incubation with a 0.02% TTC solution. Error bars indicate standard deviation between duplicates. FIG. 2D. Corresponds to number of CFUs per pellicle re-suspended in 1 ml of MSgg medium. Error bars indicate standard deviation between duplicates.

μl of bacterial pre-cultures ($OD_{600}$ 1, LB broth) were inoculated in the center of Petri dishes containing MSgg solid medium, supplemented or not with congo red dye (20 μg/ml Congo Red, CR). Plates were incubated at 30° C. for 3 days before images were collected.

Figure 4:
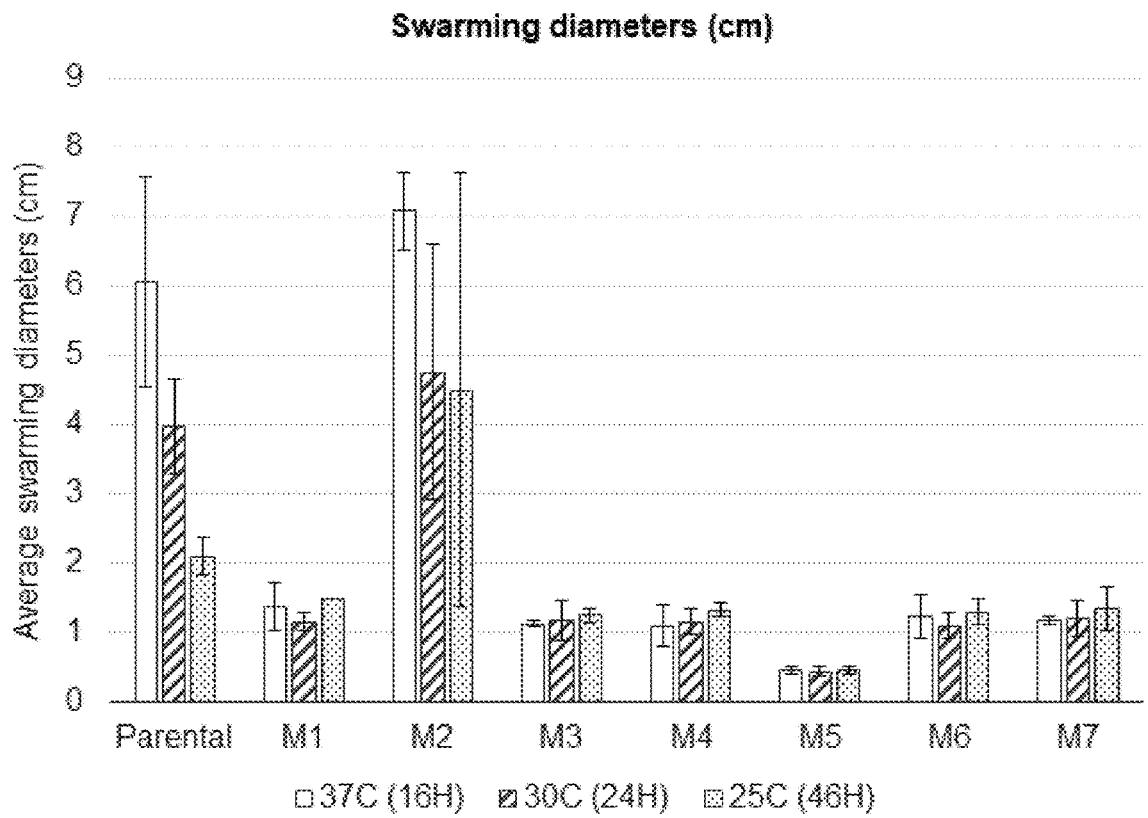

FIG. 4—Swarming diameters reached by colonies of DSM33110 (or parental) and biofilm improved derivatives (iPH2970 M1-M7). Swarming halo diameters measured in MSgg medium at different temperatures (25-30-37° C.). Error bars correspond to standard deviation between 4 replicates (2×2 biological replicates).

Figure 5A:
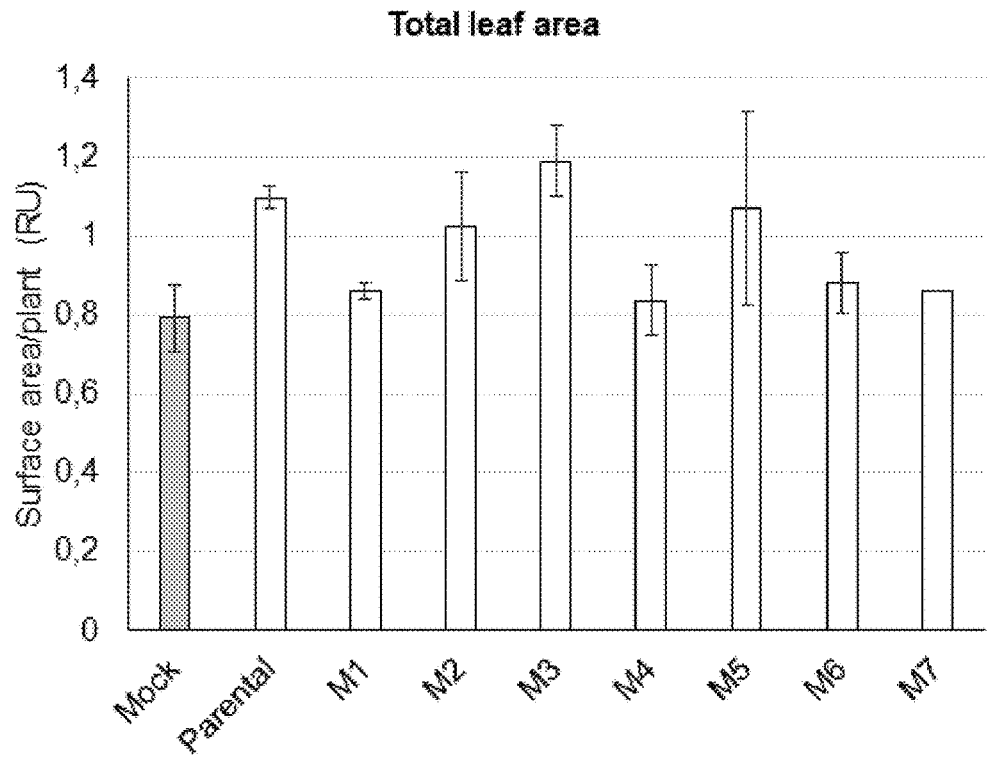
Figure 5B:
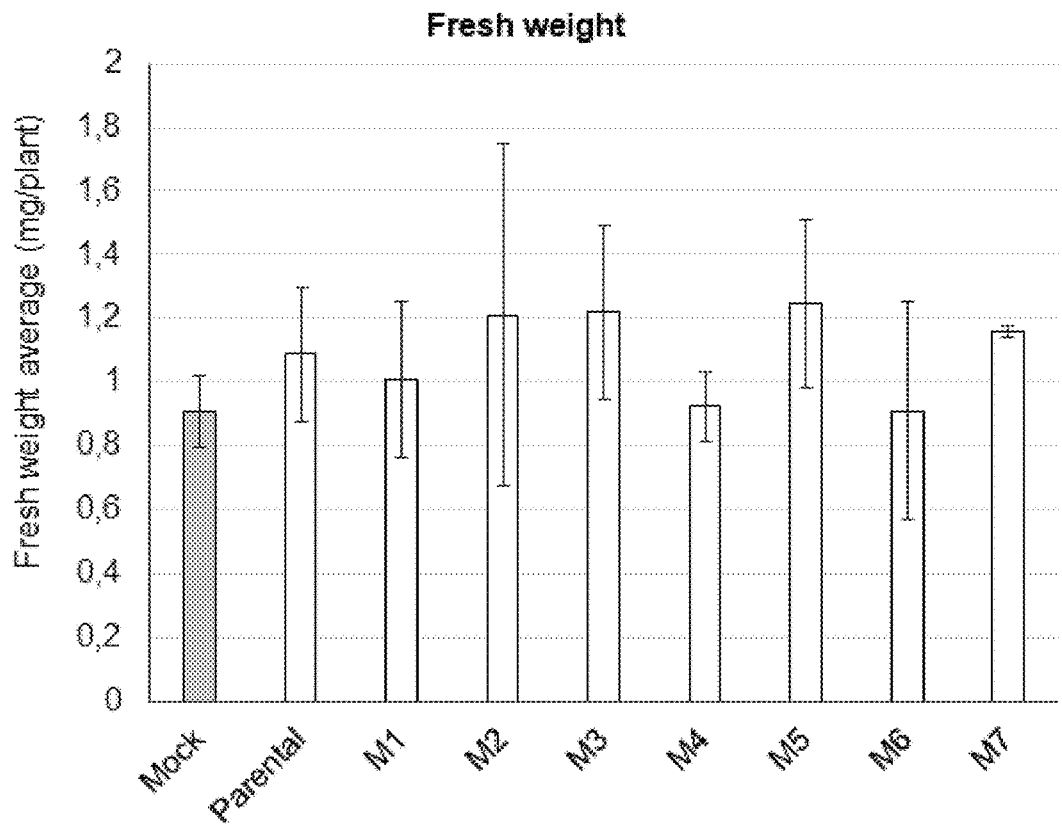
Figure 5C:
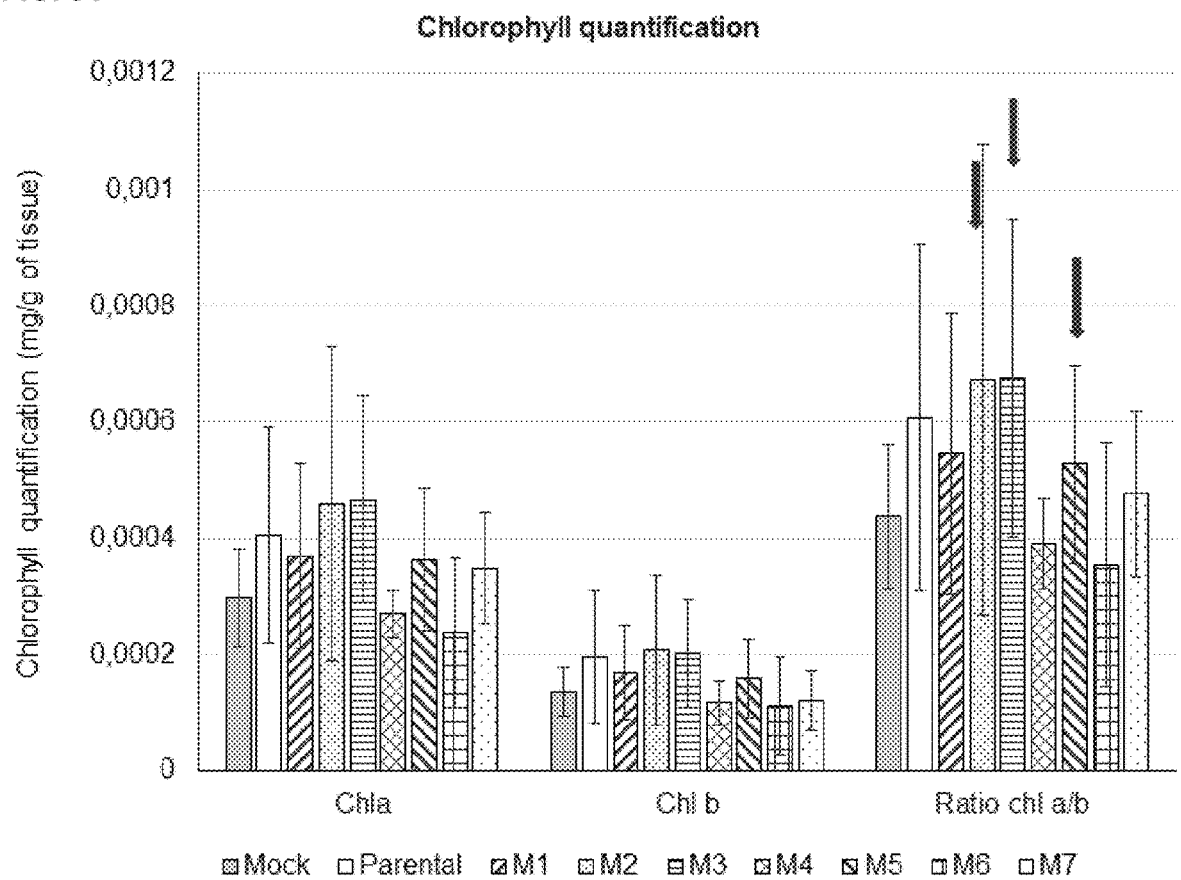

FIG. 5—Plant growth and fitness promotion quantification results from DSM31100 (or parental) and 7 biofilm improved derivative strains (M1-M7, corresponding to DSM33111-DSM33117 respectively). FIG. 5A. Corresponds to the total leaf area measurements average calculated per plant (48 plants per strain). FIG. 5B. Corresponds to the average fresh weight per plant. FIG. 5C. Corresponds to chlorophyll quantification results normalized by fresh weight. Error bars correspond to standard deviation between samples.

Figure 6A:
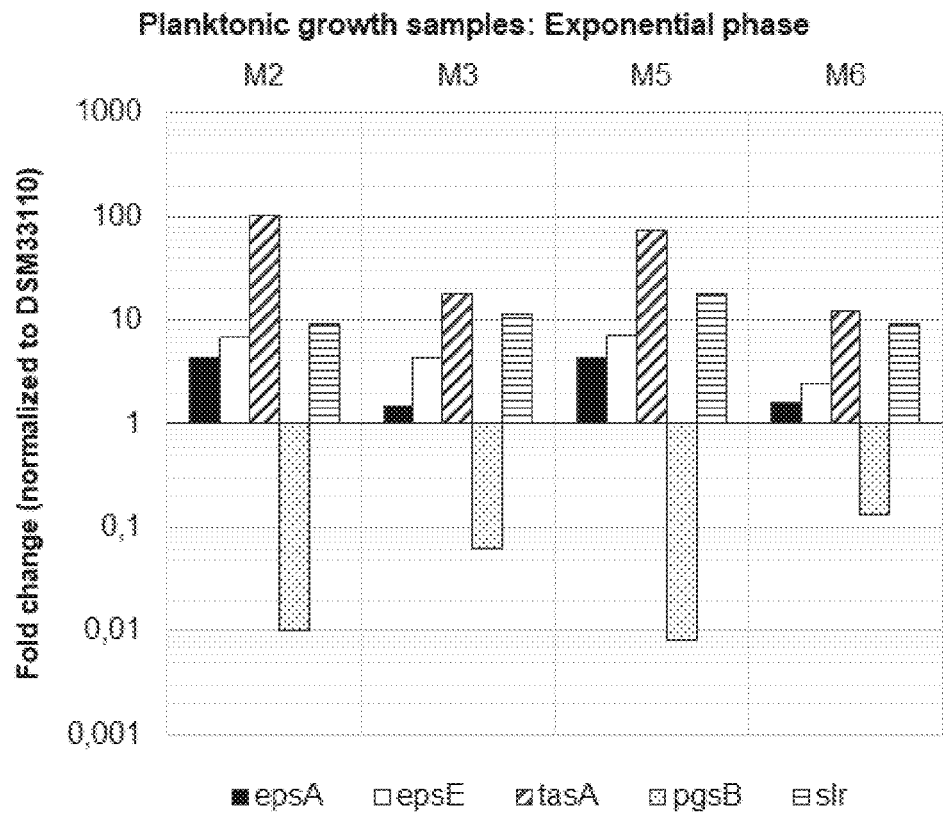
Figure 6B:
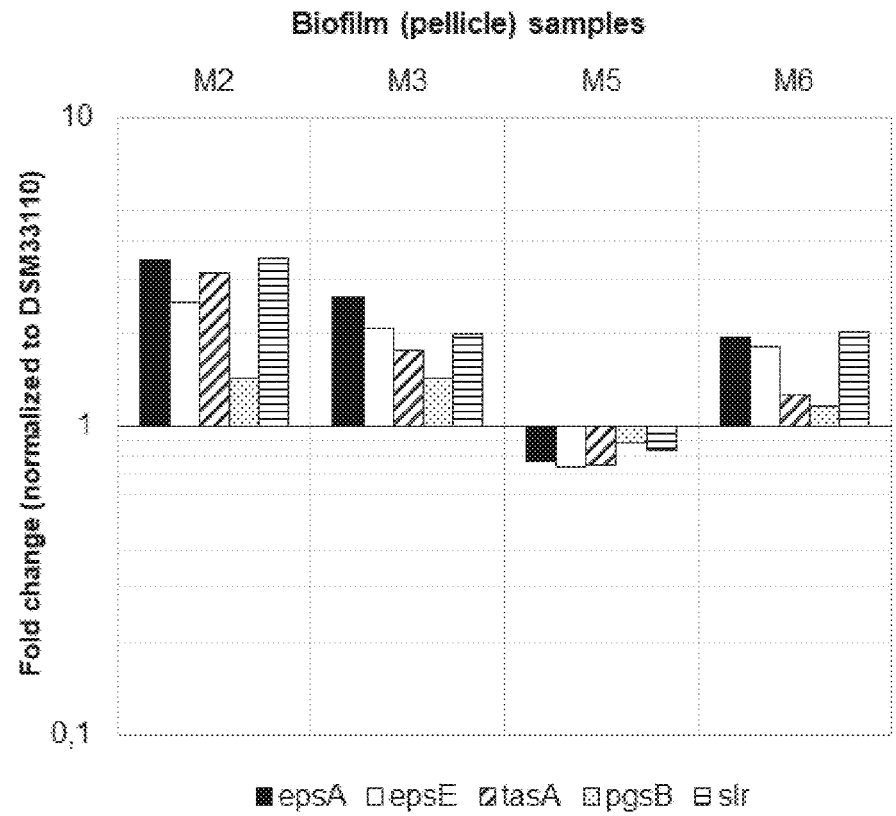

FIG. 6—RT-qPCR expression analysis of biofilm related genes (epsA, epsE, tasA, pgsB and sir). Fold change (relative expression levels) between DSM33110 and biofilm improved derivatives DSM33112-DSM33113-DSM33115 and DSM33116 (iPH2970 M2-M3-M5-M6, respectively) is represented in the plots. FIG. 6A. Fold change (relative expression) compared between bacterial cultures growing in planktonic growth conditions. FIG. 6B. Relative fold change expression levels compared between bacterial cultures growing in biofilm growth conditions. Fold change expression was normalized to expression in the parental strain DSM33110.

Figure 7:
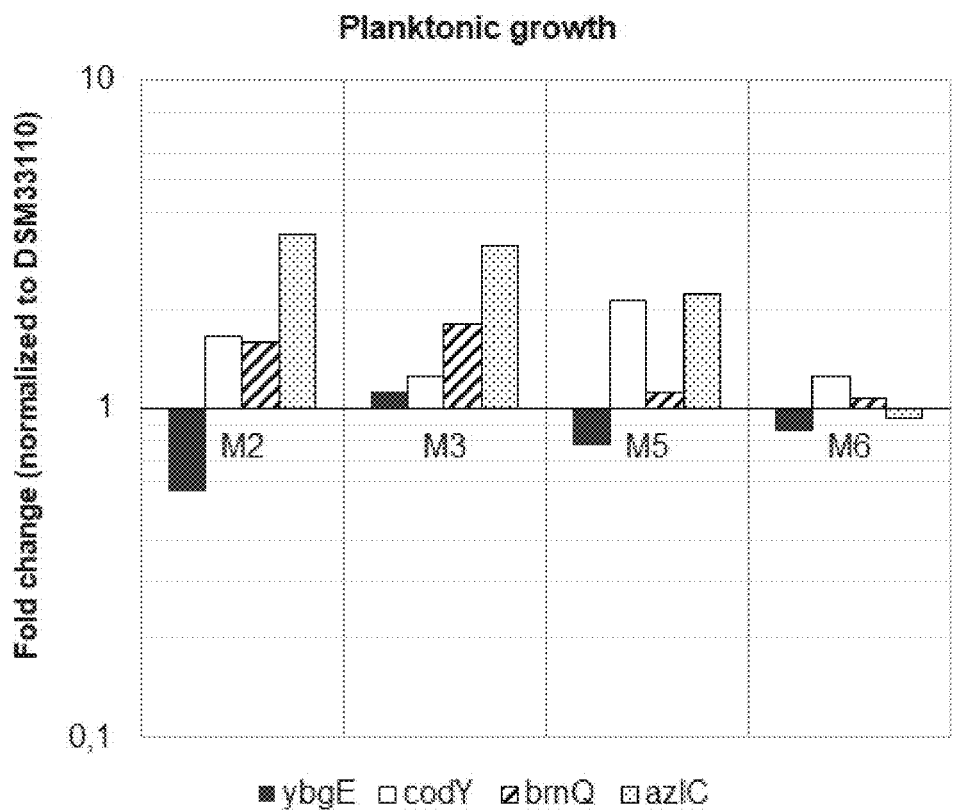

FIG. 7—RT-qPCR expression analysis of GntR regulated genes (azlC and brnQ), the global regulator CodY and its regulated gene ybgE. Fold change (relative expression levels) between DSM33110 and biofilm improved derivatives DSM33112-DSM33113-DSM33115 and DSM33116 (iPH2970 M2-M3-M5-M6, respectively) is represented in the plots. Fold change (relative expression) compared between bacterial cultures growing in planktonic growth conditions. Fold change expression was normalized to expression in the parental strain DSM33110.

Figure 8A:
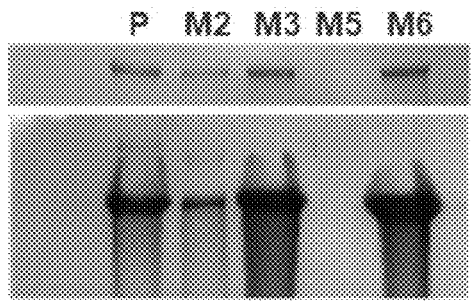
Figure 8B:
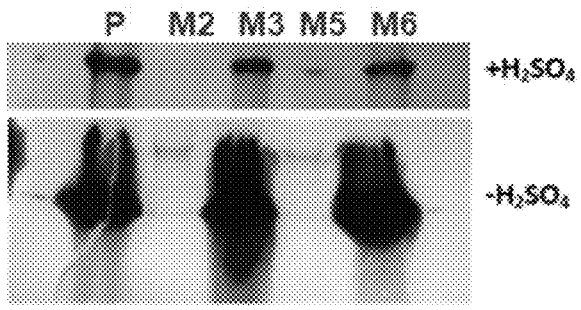
Figure 8C:
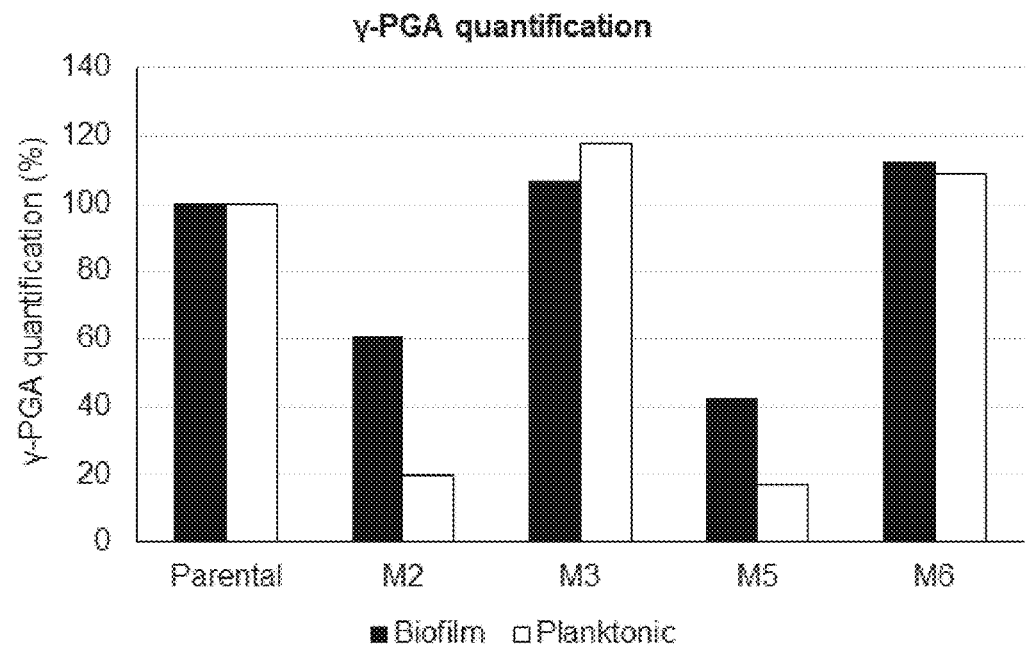

FIG. 8—γ-PGA purification, gel electrophoresis and quantification. FIG. 8A. Scanned image corresponding to SDS-PAGE gel stained with methylene blue. γ-PGA samples correspond to biofilm culture supernatants of strains DSM33110 and derivatives DSM33112-DSM33113-DSM33115 and DSM33116 (iPH2970 M2-M3-M5-M6, respectively). FIG. 8B. Scanned image corresponding to SDS-PAGE gel stained with methylene blue. γ-PGA samples correspond to planktonic culture supernatants FIG. 8C. Plots corresponds to results from band intensity quantification from gels shown in A/B. Results are expressed as relative levels in respect to the parental strain DSM33110 (Parental strain), assigning a value of 100% to the γ-PGA produced by the original strain in each of the two growth conditions.

Figure 9A:
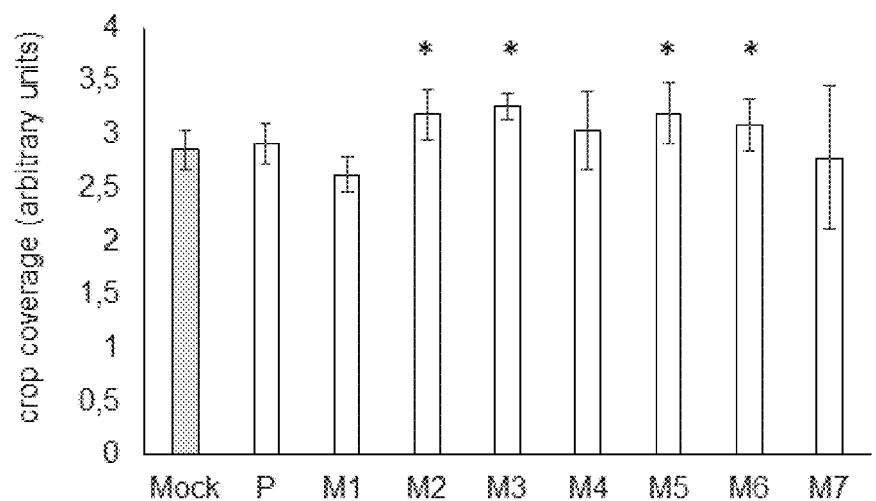
Figure 9B:
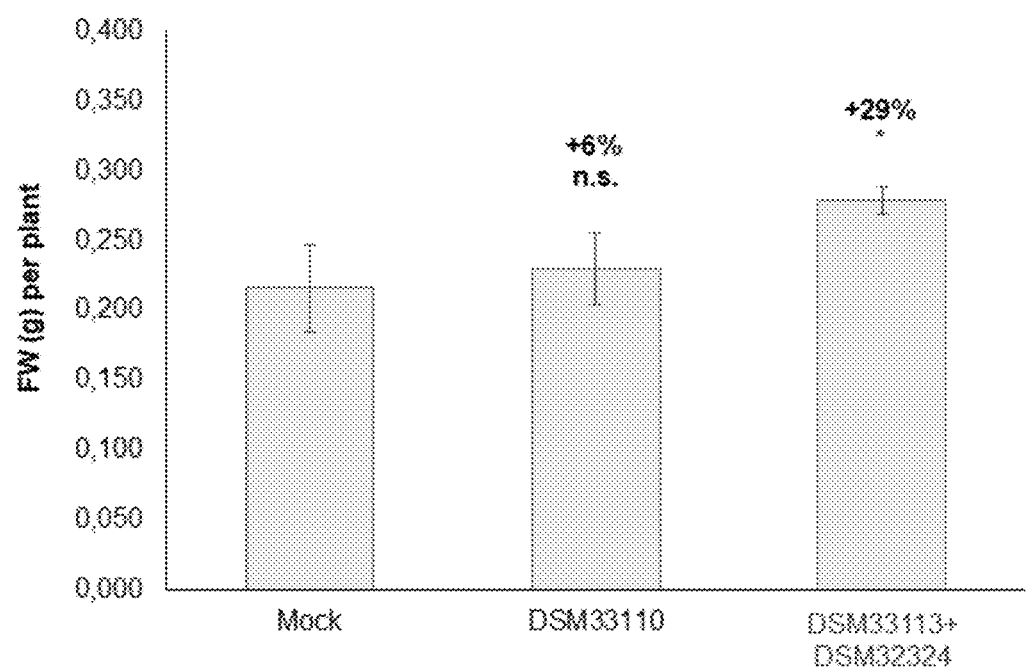

FIG. 9—Plant growth promotion by biofilm improved derivatives compared in *A. thaliana* grown in potting soil. FIG. 9A. Plant growth and fitness promotion quantification results from parental strain (DSM33110) and 7 biofilm improved derivative strains (M1-M7, corresponding to DSM33111-DSM33117 respectively). *A. thaliana* seedlings pre-grown in potting soil for 7 days, were inoculated by root dipping on bacterial cultures resuspended in 10 mM $MgSO_4$ buffer (OD600 0.1). Plantlets were allowed to grow for 14 additional days before data collection. FIG. 9B. Plant growth and fitness promotion quantification results from parental strain (DSM33110) and a formulated product combining biofilm improved derivative M3 (DSM33113) with *B. subtilis* strain and DSM32324. *A. thaliana* seedlings pre-grown in potting soil for 7 days were inoculated by root dipping on bacterial cultures resuspended in 10 mM $MgSO_4$ buffer (OD600 0.01). Plantlets were allowed to grow for 14 additional days before data collection. Error bars correspond to standard deviation between replicates and statistical significance was determined by performing a t-test ($p<0.05$) assuming equal variance in the two samples.

Figure 10A:
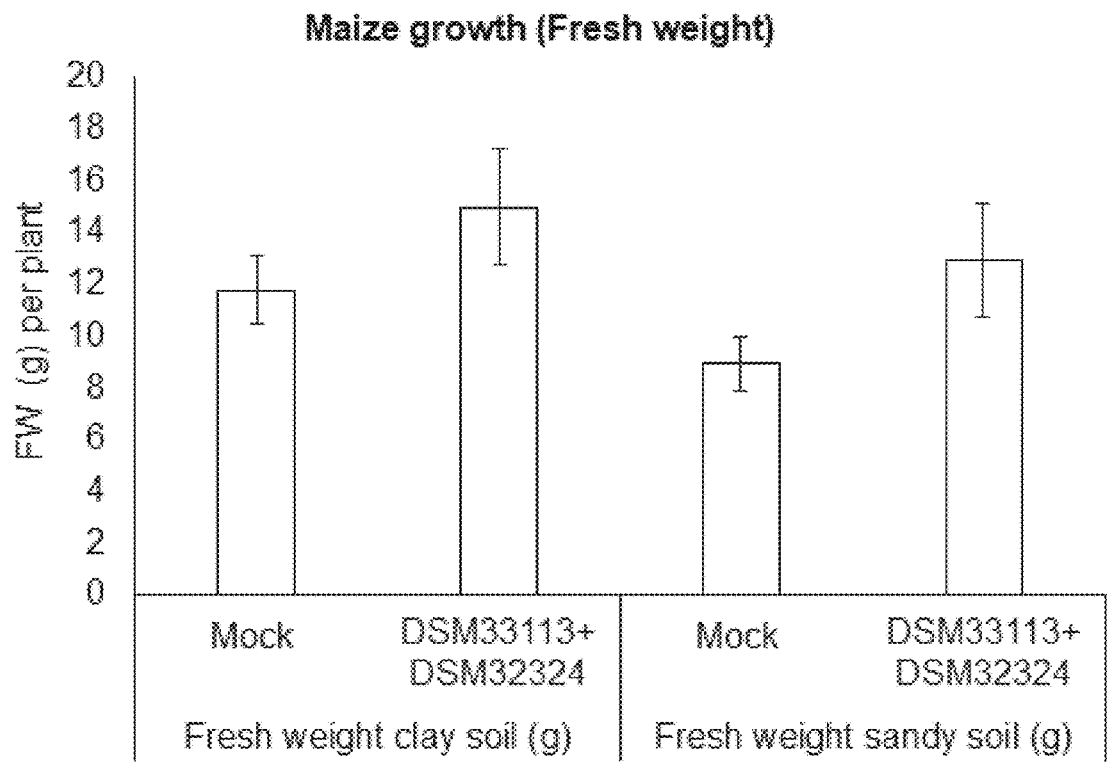
Figure 10B:
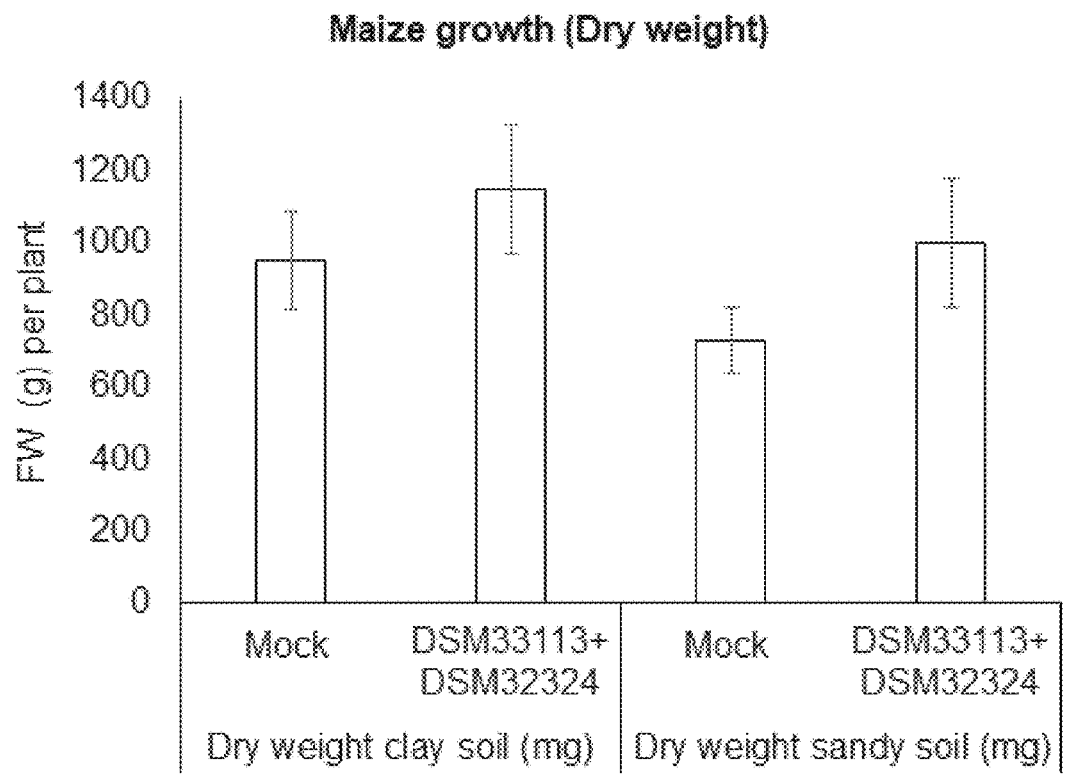

FIG. 10—Plant growth promotion by strain combination of biofilm improved derivative DSM33113 (M3) and *B. subtilis* strain DSM32324. Maize plant growth promotion quantification results for strain combination containing biofilm improved derivative DSM33113 (M3) with *B. subtilis* strain DSM32324. Maize seedlings pre-grown for 14 days were inoculated by root dipping on bacterial cultures resuspended in 10 mM $MgSO_4$ buffer (OD600 0.1). Plants were grown 14 days post-inoculation before data collection. FIG. 10A. Shoot fresh weight results from maize plants grown in clay soil (left) or sandy soil (right). FIG. 10B. Shoot dry weight results from maize plants grown in clay soil (left) or sandy soil (right). Error bars correspond to standard deviation between replicates.

DETAILED DESCRIPTION OF THE INVENTION

Rhizobacteria

The soils are home to a complex biological community, of which micro-organisms, prokaryotes and eukaryotes form a majority, both in number and in diversity. Some prokaryotes have ecological niches as the rhizosphere, and/or the rhizoplane of plants, where they multiply, survive and protect themselves from the rest of the antagonistic action of soil microflora. These organisms have been generically called rhizobacteria.

In association with plants, rhizobacteria may have a deleterious effect, null or beneficial. Those who exercise a beneficial effect—growth promotion and biological control of disease—are called PGPR ("Plant Growth-Promoting Rhizobacteria). It is estimated that only 1% to 2% of rhizobacteria have some beneficial effect for the plant with which they are associated.

PGPR as Biocontrol Agents

PGPR have been used for biological control of plant diseases and thereby increase the productivity of crops. How and why this biological control is exercised, is still a topic that needs complementary studies.

In some situations, it is possible that biological control occurs by direct antagonism exerted by PGPR against the pathogen, with involvement of the known mechanisms of antibiosis: production of antimicrobial substances, direct parasitism, competition for nutrients and ecological niches. Research has shown that certain PGPR appear to act as elicitor of ISR (induced systemic resistance), in the sense that the plant becomes systemically protected against more than one pathogen, unlike the classical biological control, which aims to implement the control more specifically.

A significant parameter affecting the PGPR ability to infect and colonize the plant surface is the ability of the PGPR to form biofilm. The inventors of present disclosure therefore seek to improve the biofilm and the plant growth promoting capabilities the Bacilli disclosed herein.

The Rhizosphere Environment

One of the most convenient methods of introducing a rhizobacteria in the root environment is through the application on the seeds before sowing. The process of seed germination releases carbohydrates and amino acids in abundance in the form of seed exudates. Thus, these organisms introduced with the seeds in the soil utilize exudates as a source of nutrition and colonize the roots as they emerge. Rhizobacteria isolates that have greater ability to utilize root exudates of seeds may have selective advantage in colonization of roots.

PGPR of the genus *Bacillus* have been associated with nematode control. Sikora, R. A. (Interrelationship between plant health promoting rhizobacteria, plant parasitic nematodes and soil microorganisms. Medicine Faculty Landbouww Rijksuniv Gent, Landbouww, v. 53, n. 2b, p. 867-878, 1988) observed reductions in infection of *Meloidogyne arenaria, M. incognita* and *Rotylenchulus reniformis* around 60-65% with treatment of seeds of various crops with a strain of *Bacillus*.

Advantages of Rhizobacteria for Commercial Application

The rhizobacteria have a number of advantages over chemical pesticides or even on other biological control agents: they are easy to mass-produce, they are easy to store and are adaptable to the formulation technology.

The rhizobacteria can be applied by treating the substrate, immersing the seedling root systems in bacterial suspensions, watering the plant with bacterial suspension by dipping/coating the seeds in suspension of rhizobacteria or by applying PGPR with the pelleting of seeds.

Bacteria of the Genus *Bacillus*

The *Bacillus* species are Gram-positive bacteria characterized by having thick cell walls and the absence of outer membranes, which differs from the Gram-negative bacteria. Much of the cell wall of Gram-positive bacteria is composed of peptidoglycan.

Gram-positive species are divided into groups according to their morphological and biochemical characteristics. The genus *Bacillus* is belonging to the group of sporulating bacteria. Bacterial spores are one of the most resilient cell types; they resist any environmental changes, withstand dry heat and certain chemical disinfectants and may persist for years on dry land.

The beneficial effect of Bacilli such as e.g. *B. paralicheniformis*, when applied near the seed or the soil, is not solely due to the antagonism afforded to pathogens. The PGPR has a positive influence on germination, development and crop yield due also to the production of substances which promote growth and improvement in plant nutrition by solubilization of phosphorus.

Current activities aim at showing the differential regulation in expression of biofilm components biosynthetic pathways, including EPS, TasA amyloid-like protein and γ-PGA, between the wt and the derivative biofilm-improved strains iPH2970 M2, M3, M5 and M6 (DSM33112, DSM33113, DSM33115 and DSM33116, respectively). In addition, genetic complementation studies will allow linking each SNP with specific phenotypic changes, namely pellicle and colony structure changes, as well as swarming motility differences.

Thus, the first aspect of the invention relates to the herein described novel strains or mutants thereof.

The composition of the present invention may, besides the active components, contain agrochemical acceptable excipients and/or vehicles thereof. The composition of the invention further comprises agrochemically acceptable carriers, vehicles and/or adjuvants.

Among the main crops of plants are sugar cane, coffee, soybeans, cotton, corn, potatoes, tomatoes, tobacco, banana, rice, wheat, avocado, pineapple, squash, cacao, coconut, oats, onion, lettuce, beet, carrot, cassava, beans, sunflower, pepper, turnip, apple, strawberry, okra, radish and onion.

With regard to fruticulture: citrus, grape, guava, papaya, fig, peach, plum and nespereira or loquat are of particular relevance and with regard to horticulture: eggplant and cruciferous.

With regard to floriculture: rose, *chrysanthemum, lisianthus, gerbera, amaryllis, begonia* and *celosia*.

The composition of present invention may be coated on the plant seed and can include an amount of *Bacillus*, such as e.g. *B. paralicheniformis* spores from about $1.0 \times 10^2$ CFU/seed to about $1.0 \times 10^9$ CFU/seed.

The plant seed can include, but is not limited to, the seed of monocots, dicots, Cereals, Corn, Sweet Corn, Popcorn, Seed Corn, Silage Corn, Field Corn, Rice, Wheat, Barley, Sorghum, Brassica Vegetables, Broccoli, Cabbage, Cauliflower, Brussels Sprouts, Collards, Kale, Mustard Greens, Kohlrabi, Bulb Vegetables, Onion, Garlic, Shallots, Fruiting Vegetables, Pepper, Tomato, Eggplant, Ground Cherry, Tomatillo, Okra, Grape, Herbs/Spices, Cucurbit Vegetables, Cucumber, Cantaloupe, Melon, Muskmelon, Squash, Watermelon, Pumpkin, Eggplant, Leafy Vegetables, Lettuce, Celery, Spinach, Parsley, Radicchio, Legumes/Vegetables (succulent and dried beans and peas), Beans, Green beans, Snap beans, Shell beans, Soybeans, Dry Beans, Garbanzo beans, Lima beans, Peas, Chick peas, Split peas, Lentils, Oil Seed Crops, Canola, Castor, Cotton, Flax, Peanut, Rapeseed, Safflower, Sesame, Sunflower, Soybean, Root/Tuber and Corm Vegetables, Carrot, Potato, Sweet Potato, Beets, Ginger, Horseradish, Radish, Ginseng, Turnip, sugarcane, sugarbeet, Grass, or Turf grass.

In one or more embodiments, the plant seed can include seed of a drybean, a corn, a wheat, a soybean, a canola, a rice, a cucumber, a pepper, a tomato, a squash, a cotton, a grass, and a turf grass.

In an alternative embodiment, the *Bacillus* or composition of present invention may be added to: soil or growth medium surrounding the plant; soil or growth medium before sowing seed of the plant in the soil or growth medium; or soil or growth medium before planting the plant, the plant cutting, the plant graft, or the plant callus tissue in the soil or growth medium.

In one or more embodiments, the plant can include soybean, bean, snap bean, wheat, cotton, corn, pepper, tomato, potato, cassava, grape, strawberry, banana, peanut, squash, pumpkin, eggplant, and cucumber.

In the compositions and methods of the present invention, the pathogenic infection can be caused by a wide variety of plant pathogens including, for example, but not limited to, a plant fungal pathogen, a plant bacterial pathogen, a rust fungus, a *Botrytis* spp., a *Botrytis cinerea*, a *Botrytis squamosa*, an *Erwinia* spp., an *Erwinia carotovora*, an *Erwinia amylovora*, a *Dickeya* spp., a *Dickeya dadantii*, a *Dickeya solani*, an *Agrobacterium* spp., a *Agrobacterium tumefaciens*, a *Xanthomonas* spp., a *Xanthomonas axonopodis*, a *Xanthomonas campestris* pv. *carotae*, a *Xanthomonas pruni*, a *Xanthomonas arboricola*, a *Xanthomonas oryzae* pv. *oryzae*, a *Xylella* spp., a *Xylella fastidiosa*, a *Candidatus* spp., a *Candidatus liberibacter*, a *Fusarium* spp., a *Fusarium culmorum*, a *Fusarium graminearum*, a *Fusarium oxysporum*, a *Fusarium oxysporum* f. sp. *Cubense*, a *Fusarium oxysporum* f. sp. *Lycopersici*, a *Fusarium virguliforme*, a *Sclerotinia* spp., a *Sclerotinia sclerotiorum*, a *Sclerotinia minor, Sclerotinia homeocarpa*, a *Cercospora/Cercospo-*

*ridium* spp., an *Uncinula* spp., an *Uncinula necator* (Powdery Mildew), a *Podosphaera* spp. (Powdery Mildew), a *Podosphaera leucotricha*, a *Podosphaera clandestine*, a *Phomopsis* spp., a *Phomopsis* viticola, an *Alternaria* spp., an *Alternaria tenuissima*, an *Alternaria porri*, an *Alternaria* alternate, an *Alternaria solani*, an *Alternaria tenuis*, a *Pseudomonas* spp., a *Pseudomonas syringae* pv. Tomato, a *Phytophthora* spp., a *Phytophthora infestans*, a *Phytophthora parasitica*, a *Phytophthora sojae*, a *Phytophthora capsici*, a *Phytophthora cinnamon*, a *Phytophthora fragariae*, a *Phytophthora* spp., a *Phytophthora ramorum*, a *Phytophthora palmivara*, a *Phytophthora nicotianae*, a *Phakopsora* spp., a *Phakopsora pachyrhizi*, a *Phakopsora meibomiae*, an *Aspergillus* spp., an *Aspergillus flavus*, an *Aspergillus niger*, a *Uromyces* spp., a *Uromyces appendiculatus*, a *Cladosporium* spp., a *Cladosporium herbarum*, a *Rhizopus* spp., a *Rhizopus arrhizus*, a *Penicillium* spp., a *Rhizoctonia* spp., a *Rhizoctonia solani*, a *Rhizoctonia zeae*, a *Rhizoctonia oryzae*, a *Rhizoctonia caritae*, a *Rhizoctonia cerealis*, a *Rhizoctonia crocorum*, a *Rhizoctonia fragariae*, a *Rhizoctonia ramicola*, a *Rhizoctonia rubi*, a *Rhizoctonia leguminicola*, a *Macrophomina phaseolina*, a *Magnaorthe oryzae*, a *Mycosphaerella* spp., *Mycosphaerella graminocola*, a *Mycosphaerella fijiensis* (Black sigatoga), a *Mycosphaerella pomi*, a *Mycosphaerella citri*, a *Magnaporthe* spp., a *Magnaporthe grisea*, a *Monilinia* spp., a *Monilinia fruticola*, a *Monilinia vacciniicorymbosi*, a *Monilinia laxa*, a *Colletotrichum* spp., a *Colletotrichum gloeosporiodes*, a *Colletotrichum acutatum*, a *Colletotrichum candidum*, a *Diaporthe* spp., a *Diaporthe citri*, a *Corynespora* spp., a *Corynespora Cassiicola*, a *Gymnosporangium* spp., a *Gymnosporangium juniperi-virginianae*, a *Schizothyrium* spp., a *Schizothyrium pomi*, a *Gloeodes* spp., a *Gloeodes pomigena*, a *Botryosphaeria* spp., a *Botryosphaeria dothidea*, a *Neofabraea* spp., a *Wilsonomyces* spp., a *Wilsonomyces carpophilus*, a *Sphaerotheca* spp., a *Sphaerotheca macularis*, a *Sphaerotheca pannosa*, a *Erysiphe* spp., a *Stagonospora* spp., a *Stagonospora nodorum*, a *Pythium* spp., a *Pythium ultimum*, a *Pythium aphanidermatum*, a *Pythium irregularum*, a *Pythium ulosum*, a *Pythium lutriarium*, a *Pythium sylvatium*, a *Venturia* spp, a *Venturia inaequalis*, a *Verticillium* spp., a *Ustilago* spp., a *Ustilago nuda*, a *Ustilago maydis*, a *Ustilago scitaminea*, a *Claviceps* spp., a *Claviceps puprrea*, a *Tilletia* spp., a *Tilletia tritici*, a *Tilletia laevis*, a *Tilletia horrid*, a *Tilletia controversa*, a *Phoma* spp., a *Phoma glycinicola*, a *Phoma exigua*, a *Phoma lingam*, a *Cocliobolus sativus*, a *Gaeumanomyces gaminis*, a *Colleototricum* spp., a *Rhychosporium* spp., *Rhychosporium secalis*, a *Biopolaris* spp., a *Helminthosporium* spp., a *Helminthosporium secalis*, a *Helminthosporium maydis*, a *Helminthosporium solai*, and a *Helminthosporium tritici-repentis*, or combinations thereof.

In some embodiments, the pathogenic infection can be caused by one or a combination of: Soybean rust fungi (*Phakopsora pachyrhizi, Phakopsora meibomiae*) and the plant comprises soybean; *Botrytis cinerea* (*Botrytis* Blight) and the plant comprises grape; *Botrytis cinerea* (*Botrytis* Blight) and the plant comprises strawberry; *Botrytis cinerea* (*Botrytis* Blight) and the plant comprises tomato; *Alternaria* spp. (e.g. *A. solani*) and the plant comprises tomato; *Alternaria* spp. (e.g. *A. solani*) and the plant comprises potato; Bean Rust (*Uromyces appendiculatus*) and the plant comprises common bean; *Microsphaera diffusa* (Soybean Powdery Mildew) and the plant comprises soybean; *Mycosphaerella fijiensis* (Black sigatoga) or *Fusarium oxysporum* f. sp. *cubense* (Panama disease) and the plant comprises banana; *Xanthomonas* spp. or *Xanthomonas oryzae* pv. *oryzae* and the plant comprises rice; *Xanthomonas axonopodis* and the plant comprises cassava; *Xanthomonas campestris* and the plant comprises tomato; *Botrytis cinerea* (Pepper *Botrytis* Blight) and the plant comprises pepper; Powdery mildew and the plant comprises a cucurbit; *Sclerotinia sclerotiorum* (white mold) and the plant comprises snap bean; *Sclerotinia sclerotiorum* (white mold) and the plant comprises potato; *Sclerotinia* homeocarpa (dollar spot) and the plant comprises turfgrass; Southern White Mold and the plant comprises peanut; Leaf spot (*Cercospora/Cercosporidium*) and the plant comprises peanut; *Fusarium graminearum* (Wheat Head Scab) and the plant comprises wheat; *Mycosphaerella graminicola* (*Septoria tritici* blotch) and the plant comprises wheat; *Stagonospora nodorum* (glume blotch and *Septoria nodorum* blotch), and the plant compromises wheat; *Erwinia amylovora*, and the plant compromises apple, pear and other pome fruits; *Venturia inaequalis*, and the plant compromises apple, pear and other pome fruits; or *Rhizoctonia solani* and the plant comprises wheat, rice, turfgrass, soybean, corn, legumes and vegetable crops. The compositions including the bacilli as described herein strain can be in the form of a liquid, an oil dispersion, a dust, a dry wettable powder, a spreadable granule, or a dry wettable granule. More specifically the composition may for example be an emulsion concentrate (EC), a suspension concentrate (SC), a suspo-emulsion (SE), a capsule suspension (CS), a water dispersible granule (WG), an emulsifiable granule (EG), a water in oil emulsion (EO), an oil in water emulsion (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a dispersible concentrate (DC), a wettable powder (WP) or any technically feasible formulation in combination with agriculturally acceptable adjuvants.

The present invention relates to a composition comprising *Bacillus paralicheniformis* DSM33111, DSM33112, DSM33113, DSM33114, DSM33115, DSM33116 or DSM33117, or mutants thereof or a mutant thereof, and to a kit comprising the composition, or prepared by the process of preparing the composition, as well as instructions and a suitable recipient.

A process for preparing a composition comprising *Bacillus paralicheniformis* DSM33111, DSM33112, DSM33113, DSM33114, DSM33115, DSM33116 or DSM33117, or a mutant thereof together with agrochemically acceptable carriers, vehicles and/or adjuvants, and use of said composition for controlling, combating and/or conferring specific resistance to phytonematodes are also given.

In addition, the invention refers to the use of effective amounts of *Bacillus paralicheniformis* DSM33111, DSM33112, DSM33113, DSM33114, DSM33115, DSM33116 or DSM33117 mutant thereof, in the manufacture of an agrochemical composition with plant growth promoting effect in a plant culture, as well as processes for promoting plant health.

In the context of the present invention, original strain or parental strain or mother strain or wt strain or parental *B. paralicheniformis* or DSM 33110 are synonyms and are herein interchangeable.

In the context of the present invention, M1 or DSM 33111 or *Bacillus paralicheniformis* DSM 33111 are synonyms and are herein interchangeable.

In the context of the present invention, M2 or DSM 33112 or *Bacillus paralicheniformis* DSM 33112 are synonyms and are herein interchangeable.

In the context of the present invention, M3 or DSM 33113 or *Bacillus paralicheniformis* DSM 33113 are synonyms and are herein interchangeable.

In the context of the present invention, M4 or DSM 33114 or *Bacillus paralicheniformis* DSM 33114 are synonyms and are herein interchangeable.

In the context of the present invention, M5 or DSM 33115 or *Bacillus paralicheniformis* DSM 3315 are synonyms and are herein interchangeable.

In the context of the present invention, M6 or DSM 33116 or *Bacillus paralicheniformis* DSM 33116 are synonyms and are herein interchangeable.

In the context of the present invention, M7 or DSM 33117 or *Bacillus paralicheniformis* DSM 33117 are synonyms and are herein interchangeable.

In the context of the present invention, mock or control or non-inoculated plants are synonyms and are herein interchangeable.

In the context of the present invention, a mutation is to be understood as an alteration in the wild-type nucleotide sequence of the genome of an organism resulting in changes in the phenotype of said organism, wherein the alteration may be a deletion of a nucleotide, a substitution of a nucleotide by another nucleotide, an insertion of a nucleotide, or a frameshift. In the context of the present invention, a deletion is to be understood as a genetic mutation resulting in the removal of one or two nucleotides of wild-type nucleotide sequence of the genome of an organism; a insertion is to be understood as the addition of one or more nucleotides to the wild-type nucleotide sequence; a substitution (or point mutation) is to be understood as a genetic mutation where a nucleotide of wild-type nucleotide sequence is changed by another nucleotide; a frameshift is to be understood as a genetic mutation caused by a insertion or deletion of a number of nucleotides in a wild-type nucleotide sequence that is not divisible by three, therefore changing the reading frame and resulting in a completely different translation from the original reading frame; an introduction of a stop codon is to be understood as a point mutation in the DNA sequence resulting in a premature stop codon; a inhibition of substrate binding of the encoded protein is to be understood as any mutation in the nucleotide sequence that leads to a change in the protein sequence responsible for preventing binding of a substrate to its catalytic site of the protein. Furthermore, a knockout mutant is to be understood as genetic mutation resulting in the removal or deletion of a gene, such as an entire gene or an entire open reading frame from the genome of an organism.

Algorithms for aligning sequences and determining the degree of sequence identity between them are well known in the art. For the purpose of the present invention and as an example, one of these algorithms is based on aligning both sequences with the blastp as provided by the National Center for Biotechnology Information (NCBI) at the blast.ncbi.nlm.nih.gov website applying standard parameter settings (Matrix: BLOSUM62, Gap Costs: Existence: 11 Extension: 1, Conditional compositional score matrix adjustment) and subsequent quantification of identical amino acid pairs in identical positions over the aligned amino acid sequences. A similar process may be carried out for aligning nucleotide sequences using, in this case, blastn as provided by the National Center for Biotechnology Information (NCBI) at the blast.ncbi.nlm.nih.gov website applying standard parameter.

The following listed aspects are further comprised by present invention:

Aspect 1. A *Bacillus* having a mutation in the pdeH, oppA and/or gntR gene, such as a *Bacillus* having a mutation in the pdeH gene, oppA gene, gntR gene, pdeH and oppA genes, pdeH and gntR genes, oppA and gntR genes, pdeH and oppA and gntR genes, preferably a *Bacillus* having a mutation in the pdeH gene, gntR gene, oppA and gntR genes, pdeH and oppA and gntR genes.

Aspect 2. A *Bacillus* having a mutation in the pdeH, oppA and/or gntR gene when compared to the corresponding ortholog genes in *B. paralicheniformis* deposited as DSM33110, such as a *Bacillus* having a mutation in the pdeH gene, oppA gene, gntR gene, pdeH and oppA genes, pdeH and gntR genes, oppA and gntR genes, pdeH and oppA and gntR genes, preferably a *Bacillus* having a mutation in the pdeH gene, gntR gene, oppA and gntR genes, pdeH and oppA and gntR genes.

Aspect 3. A *Bacillus* according to any of the preceding aspects, wherein the closest ortholog of the pdeH gene of *B. paralicheniformis* deposited as DSM33110 share less than 100% such as e.g. less than 99%, less than 98%, less than 97% sequence identity with SEQ ID NO:1.

Aspect 4. A *Bacillus* according to any of the preceding aspects, wherein the closest ortholog of the pdeH gene of *B. paralicheniformis* deposited as DSM33110 share at least 95% such as e.g. at least 96%, at least 97%, at least 98%, at least 99% sequence identity with SEQ ID NO:1.

Aspect 5. A *Bacillus* according to any of the preceding aspects, wherein the closest ortholog of the oppA gene of *B. paralicheniformis* deposited as DSM33110 share less than 100% such as e.g. less than 99%, less than 98%, less than 97% sequence identity with SEQ ID NO:3 or 7.

Aspect 6. A *Bacillus* according to any of the preceding aspects, wherein the closest ortholog of the oppA gene of *B. paralicheniformis* deposited as DSM33110 share at least 95% such as e.g. at least 96%, at least 97%, at least 98%, at least 99% sequence identity with SEQ ID NO:3 or 7.

Aspect 7. A *Bacillus* according to any of the preceding aspects, wherein the closest ortholog of the gntR gene of *B. paralicheniformis* deposited as DSM33110 share less than 100% such as e.g. less than 99%, less than 98%, less than 97% sequence identity with SEQ ID NO:5.

Aspect 8. A *Bacillus* according to any of the preceding aspects, wherein the closest ortholog of the gntR gene of *B. paralicheniformis* deposited as DSM33110 share at least 95% such as e.g. at least 96%, at least 97%, at least 98%, at least 99% sequence identity with SEQ ID NO:5.

Aspect 9. A *Bacillus* according to any of the preceding aspects, wherein the mutation is a deletion, substitution or insertion, preferably the mutation in the oppA gene causes a deletion of 2 codons coding for threonine and tyrosine in positions 98 and 99, respectively, of the OppA protein and/or preferably wherein the mutation in the gntR gene causes a substitution in position 311 of GntR protein, such as substitution in position Lys311 of the GntR protein, such as Lys311Glu.

Aspect 10. A *Bacillus* according to any of the preceding aspects, wherein the mutation causes a frameshift, introduces a stop codon or inhibits substrate binding of the encoded protein, preferably wherein the mutation in the pdeH gene causes a frameshift or introduces a stop codon, more preferably wherein the mutation in the pdeH gene introduces a stop codon.

Aspect 11. A *Bacillus* according to any of the preceding aspects, wherein the protein encoded by one or more of the genes pdeH, oppA and/or gntR or one or more of their closest orthologs is rendered dysfunctional by the mutation.

Aspect 12. A *Bacillus* according to any of the preceding aspects, wherein the genome of the strain is at least 99%, such as e.g. at least 99.5%, such as e.g. at least 99.8%, such as e.g. at least 99.9% identical to the genome of the strain deposited at Deutsche Sammlung von Mikroorganismen und Zellkulturen with accession No. DSM33110.

Aspect 13. A *Bacillus* according to any of the preceding aspects, wherein the *Bacillus* is selected from: *Bacillus licheniformis, Bacillus amyloliquefaciens, Bacillus paralicheniformis, Bacillus cereus, Bacillus velezensis, Bacillus megaterium*, preferably *Bacillus paralicheniformis*.

Aspect 14. A *Bacillus* according to any of the preceding aspects, wherein the strain is derived from the strain deposited at Deutsche Sammlung von Mikroorganismen und Zellkulturen with accession No. DSM33110 or a strain sharing phenotypical characteristics with the strain deposited at Deutsche Sammlung von Mikroorganismen und Zellkulturen with accession No. DSM33110.

Aspect 15. A *Bacillus* according to any of the preceding aspects wherein the *Bacillus* has the phenotypical characteristics of one or more of the strains deposited at Deutsche Sammlung von Mikroorganismen und Zellkulturen with accession No's. DSM33111, DSM33112, DSM33113, DSM33114, DSM33115, DSM33116, DSM33117.

Aspect 16. A *Bacillus paralicheniformis* according to any of the preceding aspects wherein the *B. paralicheniformis* is selected from a list consisting of the strains deposited at Deutsche Sammlung von Mikroorganismen und Zellkulturen with accession No's. DSM33111, DSM33112, DSM33113, DSM33114, DSM33115, DSM33116, DSM33117.

Aspect 17. A *Bacillus paralicheniformis* according to any of the preceding aspects showing increased pellicle biofilm formation when compared to its parental strain deposited at Deutsche Sammlung von Mikroorganismen und Zellkulturen with accession DSM33110.

Aspect 18. A composition comprising a *Bacillus* according to any of the preceding aspects.

Aspect 19. A composition comprising a *Bacillus* according to any of the preceding aspects and agrochemically acceptable excipients and/or carriers thereof.

Aspect 20. The composition of any of aspects 18 or 19, further comprising one or a combination of a microbial, a biological, or a chemical insecticide, fungicide, nematicide, bactericide, herbicide, plant extract, plant growth regulator, or fertilizer present in an amount suitable to benefit plant growth and/or to confer protection against a pathogenic infection in a susceptible plant, a carrier, a surfactant, a dispersant, or a yeast extract, preferably wherein the microbial is a *Bacillus* strain or wherein the microbial is a *Bacillus subtilis* strain or wherein the *Bacillus subtilis* strain is a strain deposited at Deutsche Sammlung von Mikroorganismen und Zellkulturen with accession No DSM32324, more preferably wherein the composition of any of aspects 18 or 9 is a composition comprising *B. paralicheniformis* strain deposited at Deutsche Sammlung von Mikroorganismen und Zellkulturen with accession No. DSM33113 further comprising a *Bacillus* strain or a *Bacillus subtilis* strain or a *Bacillus subtilis* strain deposited at Deutsche Sammlung von Mikroorganismen und Zellkulturen with accession No DSM32324, even more preferably wherein the composition of any of aspects 18 or 9 is a composition comprising *B. paralicheniformis* strain deposited at Deutsche Sammlung von Mikroorganismen und Zellkulturen with accession No. DSM33113 and the *Bacillus subtilis* strain deposited at Deutsche Sammlung von Mikroorganismen und Zellkulturen with accession No DSM32324.

Aspect 21. Use of a composition according to any of aspects 18 to 20 or a *Bacillus* according to any of aspects 1 to 17 as a biostimulant and/or bionematocide and/or plant growth enhancer and/or plant health promotor and/or plant disease or pest controller.

Aspect 22. Use of a composition, according to any of aspects 18 to 21, or a *Bacillus* according to any of aspects 1 to 17 for controlling, combating and/or conferring specific resistance to phytonematodes.

Aspect 23. Use according to any of aspects 21 or 22, wherein the phytonematodes are selected from the group consisting of *Meloidogyne, Pratylenchus, Heterodera, Globodera, Ditylenchus, Tylenchulus, Xiphinema, Radopholus, Rotylenchulus, Helicotylenchus* and *Belonolaimus*.

Aspect 24. Use according to any of aspects 21 to 23, wherein the phytonematode is selected from the group consisting of *Meloidogyne incognita, Meloidogyne javanica, Meloidogyne exigua, Meloidogyne paranaensis, Heterodera glycines* and *Pratylenchus zeae*.

Aspect 25. Use according to any of aspects 21 to 24 wherein the composition according to any of aspects 18 to 20 or the *Bacillus* according to any of aspects 1 to 17 is applied on a plant, a seed or in the habitat of a plant.

Aspect 26. Use according to aspect 25 wherein the plant is selected from the group consisting of corn, rice, sugar cane, soybean, potato, carrot, coffee and banana.

Aspect 27. Process for conferring improved resistance to phytonematodes, comprising applying an effective amount of a *Bacillus* of any of aspects 1 to 17 or a composition according to any of aspects 18 to 20 on plants and/or their habitat.

Aspect 28. Kit, comprising the composition as defined in any one of aspects 18 to 20, instructions for use and a suitable container.

Aspect 29. A plant seed coated with a composition according to any of aspects 18 to 20 present in an amount suitable to benefit plant growth and/or to confer protection against a pathogenic infection in a susceptible plant.

Aspect 30. The plant seed of aspect 29, wherein the composition comprises an amount of *Bacillus paralicheniformis* according to any of aspects 1 to 17 spores from about $1.0 \times 10^2$ CFU/seed to about $1.0 \times 10^9$ CFU/seed.

Aspect 31. The plant seed of aspect 30, wherein the composition further comprises one or a combination of a microbial, a biological, or a chemical insecticide, fungicide, nematicide, bacteriocide, or plant growth regulator present in an amount suitable to benefit plant growth and/or to confer protection against a pathogenic infection in a susceptible plant, preferably wherein the microbial is a *Bacillus* strain, more preferably wherein the microbial is a *Bacillus subtilis* strain, even more preferably wherein the *Bacillus subtilis* strain is a strain deposited at Deutsche Sammlung von Mikroorganismen und Zellkulturen with accession No DSM32324.

Aspect 32. A *Bacillus* according to any of the preceding aspects, wherein PdeH is encoded by SEQ ID NO:1 or homologs thereof, OppA is encoded by SEQ ID NO:3 or 7, preferably 7, or homologs thereof and/or GntR is encoded by SEQ ID NO:5 or homologs thereof.

Aspect 33. A method of treating a plant to enhance plant growth and/or promote plant health and/or control a plant disease, wherein the method comprises the step of applying a *Bacillus* strain according to any of the preceding aspects 1 to 17 or the step of applying a composition according to any of the preceding aspects 18 to 20, wherein the said step enhances biofilm formation or enhances pellicle biofilm formation when compared to a method a) comprising a step of applying a *Bacillus* strain deposited at Deutsche Sammlung von Mikroorganismen und Zellkulturen with accession DSM33110 or b) comprising a step of applying a composition having *Bacillus* strain deposited at Deutsche Sammlung von Mikroorganismen und Zellkulturen with accession DSM33110.

Aspect 34. The method according to the preceding aspect, further comprising a step of applying a *Bacillus* strain according to any of the preceding aspects 1 to 17 or the composition according to any of the preceding aspects 18 to 20, to soil.

Aspect 35. The method according to any of the preceding aspects 33 to 34, wherein the step of applying a *Bacillus* strain according to any of the preceding aspects 1 to 17 or the composition according to any of the preceding aspects 18 to 20, is applied before, during or after the plant or plant part comes into contact with the soil.

Aspect 36. The method according to any of the preceding aspects 33 to 35, wherein the plant part is selected from the group consisting of a seed, root, corm, tuber, bulb and rhizome.

The illustrative examples presented below serve to better describe the present invention. However, the formulations described merely refer to some means to some embodiments of the present invention and should not be taken as limiting the scope thereof.

EXAMPLES

Example 1—Adaptive Laboratory Evolution (ALE)

In laboratory conditions, *Bacillus* biofilm formation can be assessed by comparing the robustness and structure complexity of floating pellicles in the liquid-air interface (pellicle biofilm). Pellicle formation was expected to act as a good indicator of the root colonization ability of a bacterial strain. It was therefore hypothesized that improving pellicle formation in a chosen strain could theoretically improve its properties as plant growth promoting bacteria (PGPB).

An experimental setup to select for better biofilm formers was therefore designed.

Chemically defined medium (MSgg) that promotes biofilm formation was inoculated with a stock of *Bacillus paralicheniformis* (DSM33110) cell culture (OD600 1). Multi-well plates were used throughout the 12 weeks span of experimental evolution (see FIG. 1).

Figure 1:
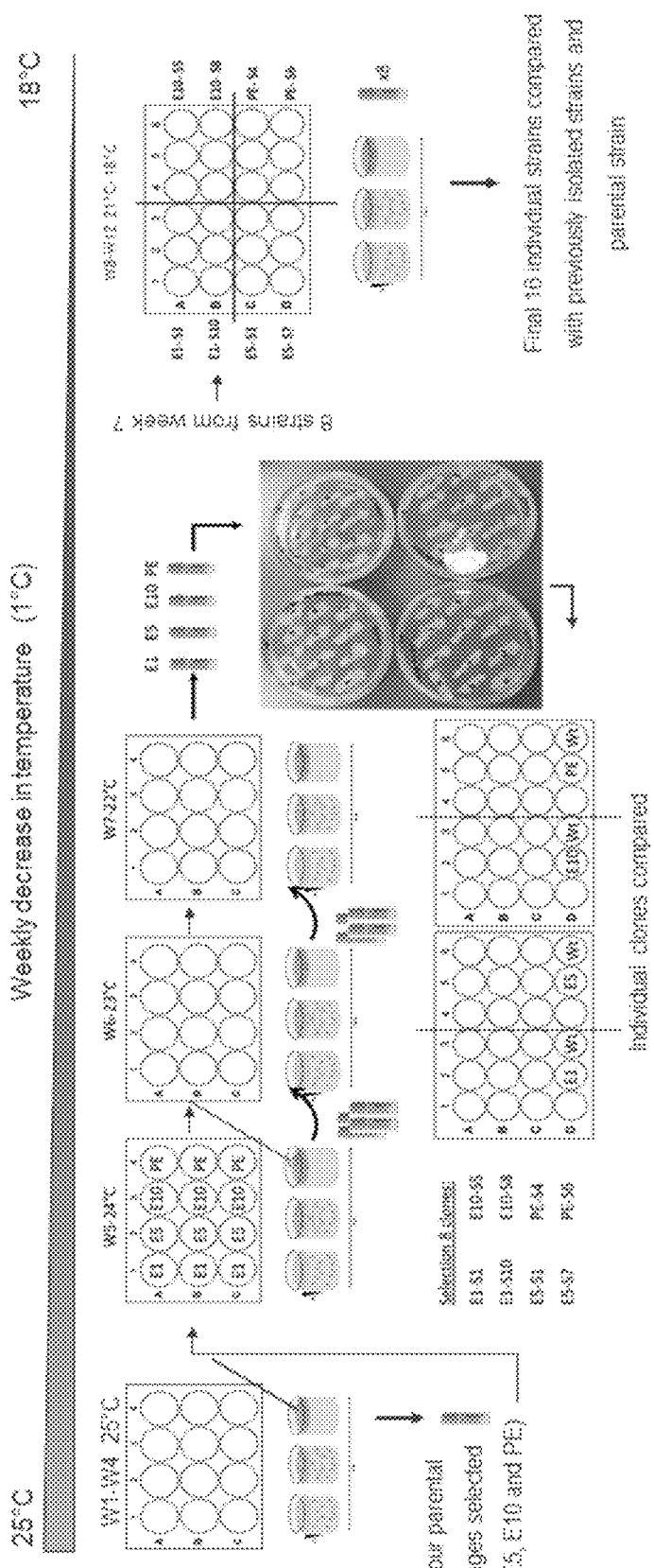
FIG. 1—ALE experimental approach to select for improved biofilm formers was followed for 12 weeks. Every 3-5 days, pellicles formed were collected with a sterile inoculation loop into a cryotube. Pellicles were disrupted, and aliquots were used to inoculate fresh medium in a new multi-well plate. At weeks 4, 7 and 12, pellicles were disrupted, and serial dilutions were plated on LB agar plates for independent clone selection. Individual clones were compared in biofilm formation with parental strain. Best biofilm formers were selected for further evolution steps or as final lineages. Temperature was gradually decreased from 25° C. to 18° C. throughout the ALE progression.
Figure 2A:
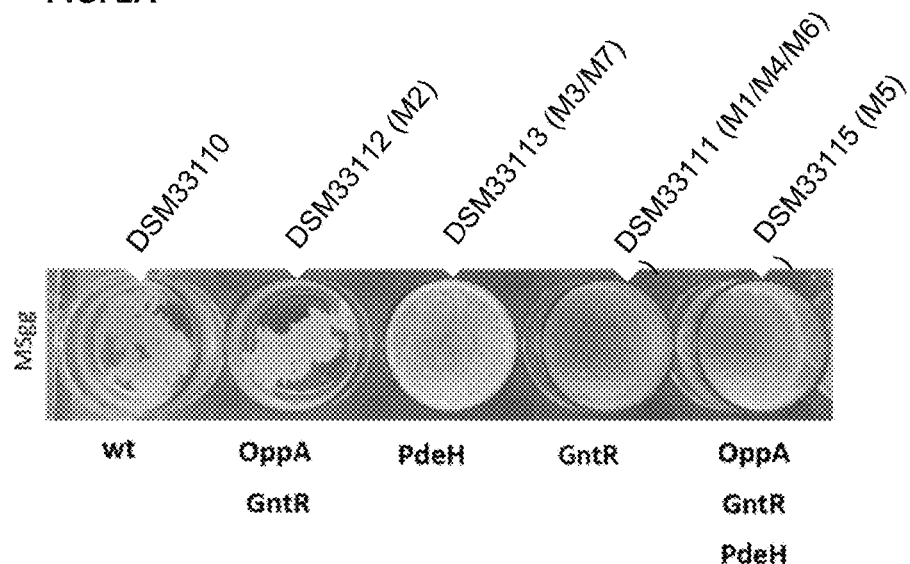
FIG. 2A. Top view image of the pellicle biofilm formation experiment comparing the parental strains *B. paralicheniformis* DSM33110 with first 7 biofilm-improved strains iPH2970 M1-M7 (DSM33111-DSM33117, respectively).
Figure 2B:
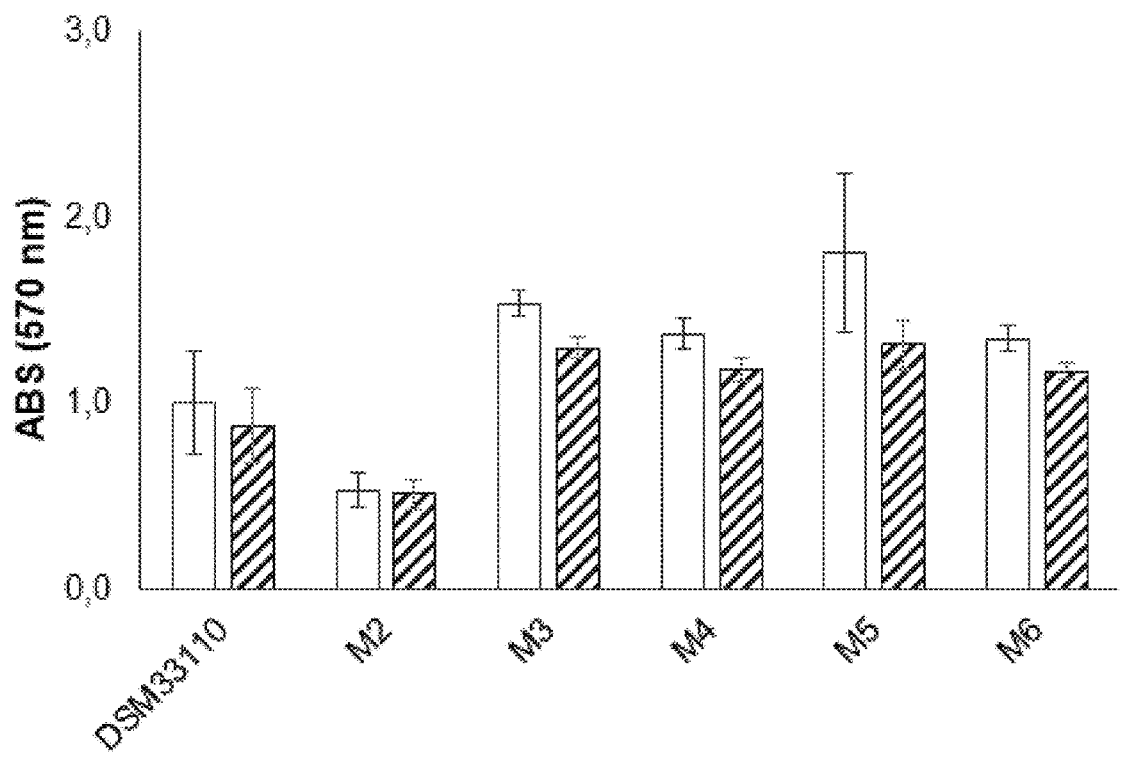
FIGS. 2B-2D. Summary of biofilm quantification results for DSM33110 and biofilm improved derivatives iPH2970 M2-M6.
Figure 2C:
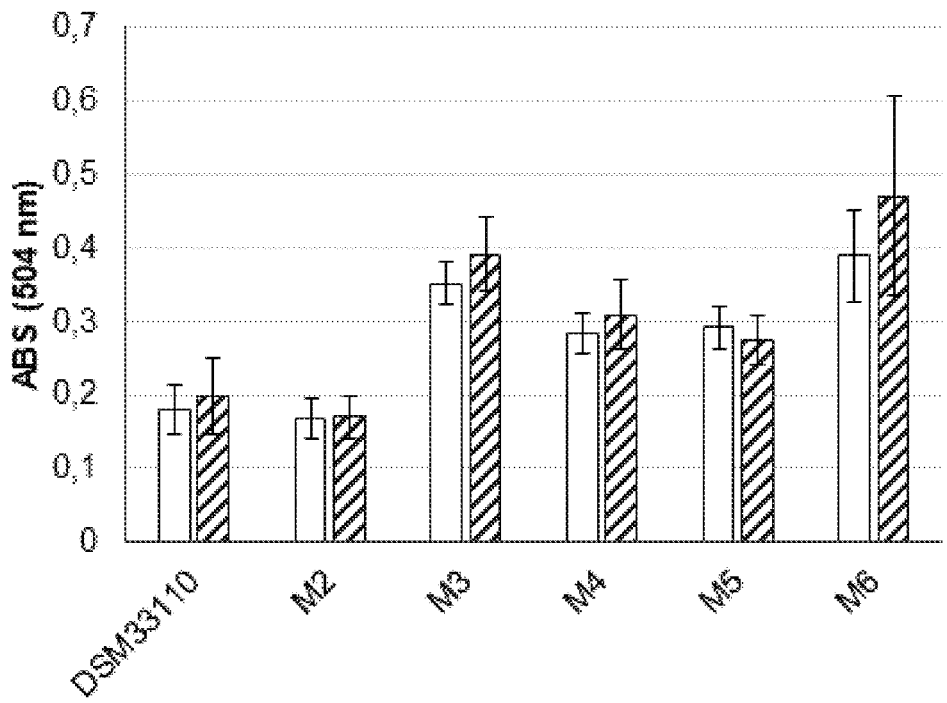
Figure 2D:
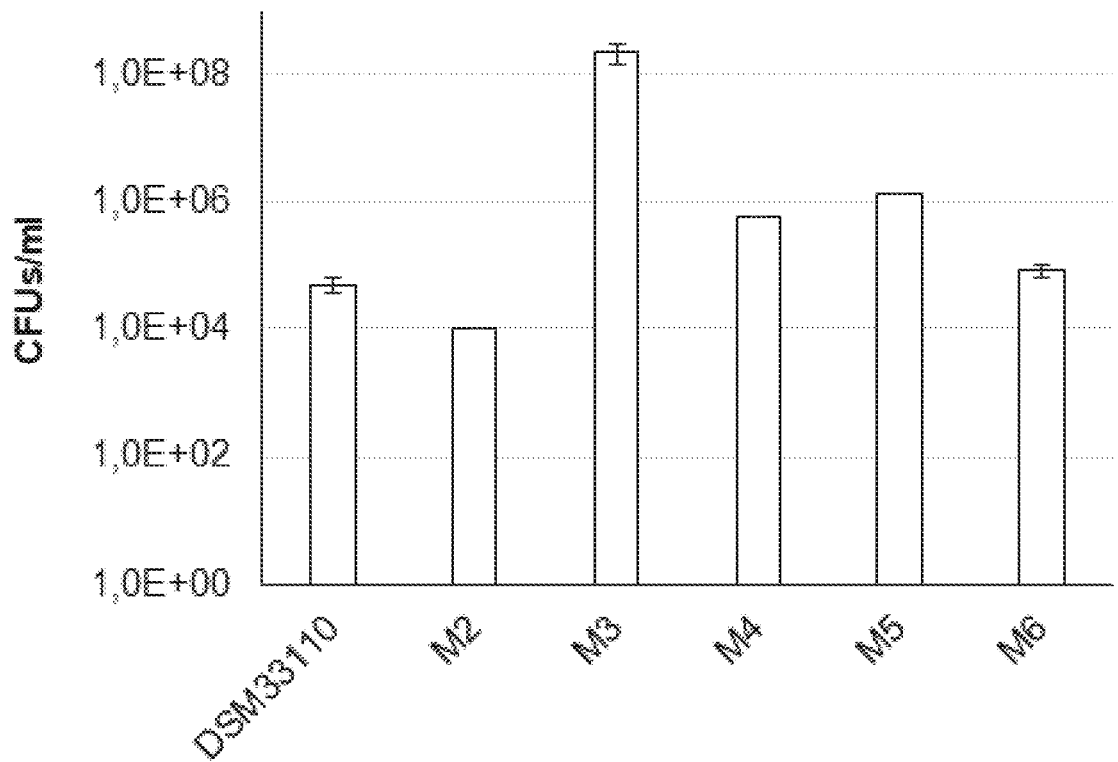

During a span of 12 weeks experimental evolution, the *Bacillus* cells forming part of the pellicle were collected with a sterile inoculation loop after sufficient growth and transferred to a glycerol tube containing 1 ml of fresh MSgg medium. Pellicle biofilms were disaggregated by vortexing the tube/s thoroughly and pellicles were sheared into small pieces. 20 ul aliquots/well were used to inoculate a new multi-well plate for a new round of biofilm formation. During the first four weeks biofilm formation proceeded at 25° C., and afterwards temperature was decreased by 1° C. every week for 8 additional weeks, where temperature reached 18° C. as schematically depicted in FIG. 1.

Three independent selection steps were carried out, after weeks 4, 7 and 12. For each selection step, an aliquot from the re-suspended biofilm was plated on LB agar plates to obtain independent colonies. Individual clones were then re-streaked on LB agar plates and used as inoculation material in the following week. Four initial clones were selected in week 4, that were further evolved until week 8. Then two clones per initial selected strain were chosen and finally after week 12, two more strains were isolated from each of the 8 derivatives selected at week 8. In total the selection regime resulted into 28 derivatives isolated, being the last 8+16 clones the most relevant ones that showed a truly differential phenotype compared to the mother strain (DSM33110).

Final selected clones (16) were deposited internally and genome sequence analysis and single nucleotide polymorphism (SNP) analysis was performed by comparing the genome sequences of the selected biofilm improved strains to the parental *B. paralicheniformis* (DSM33110) genome sequence.

Example 2—Genome Sequence Analysis

Out of 16 biofilm-improved derivatives sequenced, 8 showed mutations targeting the yuxH orf. yuxH is annotated as homologue of the c-di-GMP phosphodiesterase PdeH (yuxH) in *B. subtilis* strains (Chen, Y. et al. 2012). Cyclic di-GMP (c-di-GMP) is a second messenger that regulates diverse cellular processes in bacteria, including motility, biofilm formation, cell-cell signaling, and host colonization. Genetic studies have shown that c-di-GMP levels regulate swimming and swarming motility and influence biofilm formation, both in *B. subtilis, B. cereus* and *B. amyloliquefaciens* strains. All mutations found in yuxH were loss-of-function mutations because, either a stop codon or a frameshift in the coding sequence were introduced. Thus, selected strains with a mutation in yuxH most likely have an increased intracellular level of c-di-GMP which affects both motility and biofilm formation. We tested swarming motility in the derivative strains DSM33111 to DSM33117 and compared to the parental strain. Our results show a clear impairment in swarming motility for 6 out 7 mutants tested as compared to the mother strain (DSM33110). On the other hand, derivative strains bearing mutations in PdeH showed a clear increase in biofilm formation and colony structure phenotypes, in accordance with upregulated expression of the biofilm matrix components (see FIGS. 3-4).

TABLE 1

SNP analysis and ORF target identification. Table contains information linking biofilm improved derivatives ID/name with the corresponding DSM number. SNPs identity and frequency with which they are found are summarized.

| DSM number | Strain name | SNPs identified | Frequency |
|---|---|---|---|
| 33111 | IPH2970 M1 | Transcriptional regulator, GntR family domain/ Aspartate aminotransferase (EC2.6.1.1) Lys311Glu | 12 out of 15 (80%) |
| 33112 | iPH2970 M2 | Transcriptional regulator, GntR family domain/ Aspartate aminotransferase (EC2.6.1.1) Lys311Glu | 12 out of 15 (80%) |
| | | ABC transporter, periplasmic oligopeptide-binding protein OppA (TC 3.A.1.5.1) Deletion Thr98/Tyr99 | 2 out of 15 (13%) |

TABLE 1-continued

SNP analysis and ORF target identification. Table contains information linking
biofilm improved derivatives ID/name with the corresponding DSM number.
SNPs identity and frequency with which they are found are summarized.

| DSM number | Strain name | SNPs identified | Frequency |
|---|---|---|---|
| 33113 | iPH2970 M3 | Alternative gene name: comB, yufA:p.Gln188* | 8 out of 15 (53%) |
| 33114 | iPH2970 M4 | Transcriptional regulator, GntR family domain/ Aspartate aminotransferase (EC2.6.1.1) Lys311Glu | 12 out of 15 (80%) |
| 33115 | iPH2970 M5 | Transcriptional regulator, GntR family domain/ Aspartate aminotransferase (EC2.6.1.1) Lys311Glu | 12 out of 15 (80%) |
|  |  | ABC transporter, periplasmic oligopeptide-binding protein OppA (TC 3.A.1.5.1) Deletion Thr98/Tyr99 | 2 out of 15 (13%) |
|  |  | Alternative gene name: comB, yufA:p.Arg7fs | 8 out of 15 (53%) |
| 33116 | iPH2970 M6 | Transcriptional regulator, GntR family domain/ Aspartate aminotransferase (EC2.6.1.1) Lys311Glu | 12 out of 15 (80%) |
| 33117 | iPH2970 M7 | Alternative gene name: comB, yufA:p.Gln188* | 8 out of 15 (53%) |

Single nucleotide polymorphism (SNP) analysis of genome sequences revealed the presence of a deletion in the orf oppA in two out of 15 improved biofilm strains. OppA is the extracellular binding protein of the Opp oligopeptide ABC transporter. OppA is an oligopeptide permease, involved in quorum sensing, sporulation and competence. OppA is also one of the major protein components of Bacillus floating biofilms together with polymers of glutamic acid (γ-PGA). The opp operon encodes an oligopeptide permease required for the import of the quorum sensing pentapeptide CSF, encoded by the phrC gene. CSF contributes to the activation of the ComA transcription factor, a response regulator required for competence development. In fact, the ComX-ComP-ComA signalling pathway constitutes a major quorum response pathway in *B. subtilis*, and it regulates the production of γ-PGA (Comella, N and Grossman, A. D, 2005; Stanley, N. R. and Lazazzera, B. A. 2005). It has also been reported that a defect in the oppA gene affects eDNA production. The opp operon is also induced upon cold stress or cold cultivation conditions in *B. subtilis*. Opp helps fine-tuning the levels of Spo0A, the master regulator during sporulation initiation, to ensure survival at low temperatures.

Genome sequencing results revealed the presence of a unique SNP in an orf annotated as GntR transcriptional regulator family. This GntR regulator belongs to the MocR family of DNA-binding transcriptional regulators, which contain an aminotransferase domain. A unique SNP was found in 12 out of 15 improved biofilm strains and that particular nucleotide change results in a single amino acid change of Lys311, involved in PLP co-enzyme binding, to Glu. Pyridoxal phosphate (PLP, pyridoxal 5'-phosphate, P5P) is the active form of vitamin B6. This amino acid change found in all 12 improved biofilm strains blocks PLP coenzyme binding. The genomic region around the GntR regulator is conserved in *B. paralicheniformis* species, but not in *B. subtilis* or *B. amyloliquefaciens*. We could speculate that the function of this protein is to regulate the expression of the adjacent azl operon, which encodes a branched-chain amino acid transporter. However, further experiments comparing global expression levels between derivatives and the parental strain are needed to understand the mode of action of this mutation in GntR.

Example 3—Phenotypic Analysis on Agar Plates

Figure 3:
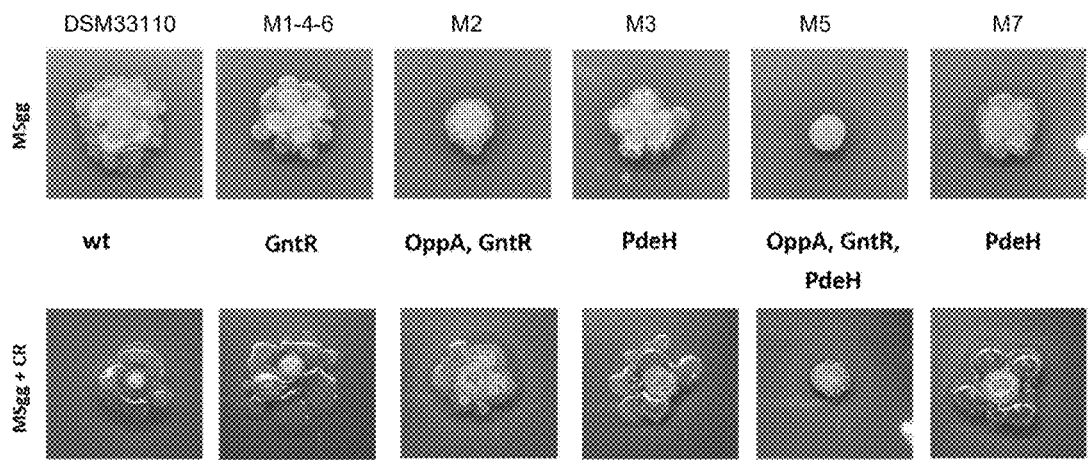
FIG. 3—Colony morphology phenotypes compared between parental strain DSM33110 and biofilm-improved derivatives DSM33111-DSM33117. Images correspond to top view images of colony structures formed by the parental *B. paralicheniformis* DSM33110 and biofilm improved derivatives (iPH2970 M1-M7, DSM33111-DSM33117). 10

Phenotypic changes in colony structure on agar plates revealed differences between the wt strain (DSM33110) and their derivatives. To better visualize changes in colony structure and matrix composition we decided to use MSgg solid media supplemented or not with 20 µg/ml Congo Red (CR) and 10 µg/ml Coomasie Brilliant Blue dyes to stain amyloid protein fibers (Romero et al. 2010). FIG. 3 shows top view images of colony structures generated by *B. paralicheniformis* (DSM33110) and evolved biofilm-improved strains DSM33111-DSM33117. Differences between the wt strain (DSM33110) and the biofilm improved derivatives could be easily appreciated even in the absence of Congo red. Derivative strains DSM33113, DSM33115 and DSM33117, bearing mutations in PdeH, show a higher degree of wrinkle formation in the center of the colony as compared with the mother strain (DSM33110). On the other hand, colonies from DSM33112 and DSM33115 appeared drier as compared to the wt strain or derivatives DSM33111 and DSM33113, where the deletion in oppA is absent. This difference in the mucoid, slimly aspect of the colonies could be attributed to differences in the amount of γ-polyglutamate being produced, which could be linked to the presence of a deletion in the oppA gene.

Example 4—Swarming Motility

Swarming motility is defined as a rapid multicellular movement of bacteria across a surface, powered by rotating flagella and highly dependent on biosurfactants production. Biofilm forming, and swarming/swimming motile cells are oppositely regulated in *Bacillus subtilis*. In addition, it has been reported previously that mutations in yuxH (pdeH) decrease swarming motility. Therefore, we performed swarming motility assays to compare the parental strain (DSM33110) and biofilm improved derivatives.

Swarming diameters were measured for each strain in duplicates at three different temperatures (25° C., 30° C. and 37° C.). Experiments were performed twice, and results are the average of the 4 replicates per strain and condition. Data shown in FIG. 4.

Example 5—Plant Growth Promotion Activity

Plant growth promotion efficiency was compared between the derivative strains using *A. thaliana* plants, in a soil system, and in a gnotobiotic system based on the use of 24-well plates filled with plant growth medium solidified with agar. Based on the results from three independent experiments, both in soil and agar systems, derivative strains iPH2970 M2, M3 and M5 were selected (DSM33112, DSM33113 and DSM33115, respectively) as the best biofilm-improved (DSM33110) derivatives.

Example 6—Changes in Gene Expression

To evaluate changes in gene expression between DSM33110 and its derivative strains, both in planktonic and biofilm growth conditions, we have performed real-time qPCR analysis using specific primers for biofilm related genes. In parallel, biochemical analysis of extracellular matrix components was carried out. A method for purification and quantification of γ-PGA was implemented. Finally, we looked at the effect of the identified mutations in surface attachment experiments, and the improved performance of selected derivatives in plant growth experiments.

Example 7—Analysis of Relative Gene Expression Levels of Biofilm Biosynthesis Related Genes (Real Time qPCR Gene Expression Quantification)

We collected samples from planktonic or biofilm growing cultures corresponding to the parental strain DSM33110 and biofilm improved derivatives carrying mutations in one, two or three of the previously described gene targets. We isolated total mRNA from both planktonic cells and biofilm of DSM33110 (Parental) and derivatives DSM33112 (M2), DSM33113 (M3), DSM33115 (M5), and DSM33116 (M6).

Next, we carried on reverse transcription (RT) followed by qPCR with specific primers for selected genes, either involved in biofilm biosynthesis regulation or biofilm matrix component biosynthesis. Differential gene expression between DSM33110 and biofilm improved derivatives was tested for genes related to biofilm matrix components biosynthesis or biofilm regulation (i.e. epsA, epsE, tasA, pgsB and slr). Expression of control genes (rpoB, strain specific primer pair DSM33110) was also analyzed by qPCR and used to normalize cDNA differences between samples.

FIG. 6 shows summary of results obtained by qPCR analysis of relative gene expression levels in biofilm improved derivative strains with respect to the parental strain DSM33110. Expression levels are represented as the fold change normalized to expression in DSM33110, which value is assigned to 1. qPCR results confirmed the role of SNPs identified in genes pdeH, oppA and gntR in the regulation of biofilm formation. Single identified amino acid changes in PdeH and GntR (strains M3 and M6) trigger overexpression of Slr, a key positive regulator of biofilm formation in *Bacillus*, EpsA and EpsE (belonging to the EPS biosynthetic pathway), and the amyloid-like protein TasA, a biofilm matrix component (FIG. 6). A decrease in gene expression of the γ-polyglutamate operon (pgsB) was detected in all mutant backgrounds in samples collected from planktonic growing cultures, but only in DSM33115 (M5) under biofilm growth conditions. PgsB repression was particularly strong in strains DSM33112 (M2) and DSM33115 (M5), which contain a 2 amino acid deletion in the OppA oligopeptide permease, confirming the initial hypothesis linking OppA functional role to the regulation of γ-polyglutamate biosynthesis.

Expression changes analyzed in the same strains but grown in biofilm forming conditions (FIG. 6B) showed a similar relative expression pattern, however the fold changes were not so affected between the parental strain and the biofilm improved derivatives. This makes sense if we consider that under those cultivation conditions biofilm formation is induced for all strains, including the parental strain.

The involvement of GntR regulator in biofilm formation was also confirmed. GntR role could be to regulate the expression of the adjacent operon azlC-azlD-paaD-brnQ, which encodes a branched-chain amino acid transporter. Levels of branched-chain amino acids (BCAAs) regulate the activity of CodY global regulator. CodY is a global regulator, sensing intracellular BCAAs and GTP levels, and that it is present in low-GC Gram positive organisms. CodY is a pleiotropic transcriptional regulator that represses the transcription of numerous genes. As a response to lower energy and BCAA levels CodY triggers adaptation of bacterial cells by activating highly diverse mechanisms, such as secretion of proteases and the expression of amino acid transporters and catabolic pathways.

Example 8—Quantification of Biofilm Components Associated Changes

Biofilm formation begins with the expression of matrix genes in response to some external signal (such as surfactin). Initially, cells are short, motile rods but as the biofilm develops, they form long chains of non-motile cells that adhere to each other and the surface by secreting an extracellular matrix. This extracellular matrix is essential to the integrity of the biofilm as it holds the community together. The *Bacillus* matrix is primarily composed of exopolysaccharide (EPS) and proteins (TasA, TapA and the hydrophobin BlsA). Several *Bacillus* spp. are known to produce poly-γ-glutamic acids (γ-PGA) as one of the major secreted polymeric substances. γ-Polyglutamic acid (γ-PGA) is a major component of the *Bacillus* biofilm matrix. Poly-γ-glutamate (PGA) is an unusual anionic polypeptide in which glutamate is polymerized via γ-amide linkages. It is water soluble, and possess good absorbability and high metal-binding capacity (Hsueh Yi-Huang 2017). In *B. subtilis* strains, the regulation of γ-PGA production and its physiological role are still unclear. Herein it is proposed that γ-PGA may contribute to robustness and complex morphology of the colony biofilms, suggesting a role of γ-PGA in biofilm formation. It is also suggested that γ-PGA may play a role in root colonization, pinpointing a possible function of γ-PGA in Bacilli-plant interactions. Several pathways co-regulate both γ-PGA and biofilm matrix components biosynthesis in *B. subtilis*, but in an opposing fashion.

γ-Polyglutamic acid (γ-PGA) produced by *Bacillus* strains can be detected by SDS-polyacrylamide gel electrophoresis (SDS-PAGE) and basic dye staining (Yamaguchi et al., 96). First γ-PGA was purified from supernatant samples of planktonic and biofilm growing cultures corresponding to the parental strain and biofilm improved derivatives (M2, M3, M5 and M6). γ-PGA was purified by using ethanol precipitation as described in Yamaguchi et al., 96 and samples were subjected or not to acid hydrolysis with sulfuric acid. γ-PGA purified samples were run on SDS-PAGE gels and stained with methylene blue solution. After distaining, gels were imaged and band quantification was done with Image J software.

FIG. 8 corresponds to the results obtained after γ-PGA purification and quantification. Our results clearly show a decreased level of γ-PGA produced by derivative strains M2 and M5 compared to the parental strains and to the other two biofilm improved derivatives (DSM33110 and the other two derivatives M3 and M6, respectively). M2 and M5 derivatives, carrying a deletion in oppA generate drier colonies (FIG. 3), which was indicative of a defect in γ-PGA production. The OppA protein, periplasmic protein of ABC transporter Opp, is involved in regulating γ-PGA production in *B. subtilis* strains. These results confirm an analogous role for this protein in *B. paralicheniformis*.

Example 9—Experimental Setup to Evaluate Plant Growth Promotion in Different Plant Species and Soil Types First, plant growth promotion efficiency was compared between derivative strains using *A. thaliana* plants in a soil system. Experiments were performed in the plant growth chambers. *A. thaliana* seedlings were germinated and pre-grown in potting soil for 7 days prior inoculation. Bacterial cultures were grown over-night the day before inoculation. In the morning of inoculation day, bacterial cultures were diluted and grown to $OD_{600}$ 1 in LB broth. Bacterial cells were then washed and resuspended into 10 mM $MgSO_4$ buffer at $OD_{600}$ 0.1. Plants were inoculated with 1e7 CFUs (18 plant replicates per strain), comparing the results from control non-inoculated plants with the parental strain and biofilm improved derivatives. Plants grew in growth chambers for 2 weeks, with 16 h light/8 h dark photoperiod, before data collection.

After 2 weeks, crop coverage and additional enzymatic parameters were quantified and compared between treatments (FIG. 9). Strains iPH2970 M2, M3, M5 and M6 (DSM33112, DSM33113, DSM33115 and DSM33116, respectively) showed the best crop coverage results in *A. thaliana* plants, showing an increase in crop coverage. Subsequent testing of the derivatives performance was done in different plant species, individually or in combination with other *Bacillus* strains, preferably with other *B. subtilis* strains.

In a second set of experiments, a different strain combination containing biofilm improved derivative M3 was compared with the original strain in their ability to promote *A. thaliana* plant growth. Strain *B. paralicheniformis* DSM33113 (M3) was co-inoculated with a *Bacillus* strain, preferably a *Bacillus subtilis* strain, as indicated in FIG. 9B.

Growth conditions and experimental setup was identical to the one described above with the only exception of decreasing the number of bacterial cells inoculated. Bacterial inoculation material was prepared at $OD_{600}$ 0.01, corresponding to 1e6 CFUs/ml. Shoot fresh weight quantification was done 2 weeks post-inoculation. Results obtained showed an increase in plant growth for all treatments compared to non-inoculated plants, with a more relevant increase being observed for the combination containing the biofilm improved derivative M3 (29% increase). The increase in fresh weight per plant observed is statistically significant compared to non-inoculated plants. Therefore, strain combination DSM33113 (M3) plus *B. subtilis*, such as *B. subtilis* DSM32324 was selected to carry on additional testing in corn plants.

Maize seeds were sown in field soil collected in Taastrup, Denmark and germinated for 2 weeks in a growth chamber with 16 h light/8 h dark photoperiod at a 24-20° C. day/night temperature, prior inoculation. Bacterial cultures were grown over-night the day before inoculation. In the morning of inoculation day, bacterial cultures were diluted and grown to $OD_{600}$ 1 in LB broth. Bacterial cells were then washed and resuspended into 10 mM $MgSO_4$ buffer at $OD_{600}$ 0.1. Germinated seedlings (8 plant replicates per condition) were root-dipped in the bacterial solution and replanted in pots containing two types of field soil (clay and sandy soil types). Plants grew in growth chambers for 2 weeks, with 16 h light/8 h dark photoperiod, before data collection. Shoot fresh weight was recorded immediately after harvesting. The harvested samples were placed in a 70° C. degrees oven for 3 days before dry weight values were recorded.

Comparing the results from control non-inoculated plants (mock) with inoculated plants revealed a clear plant growth promotion effect in maize plants. Both positive results in clay and sandy field soil types were statistically significant, and supported the beneficial effect of the biofilm improved strain DSM33113 in combination with another *Bacillus* strain such as a *B. subtilis* strain, preferably in combination with *B. subtilis* DSM32324 strain.

CONCLUSION

To summarize, derivative *B. paralicheniformis* (DSM33110) strains with improved biofilm formation were developed following an adaptive laboratory evolution campaign. Several Different derivatives were selected, and their genomes sequenced to identify the acquired genotypic changes. Derivative strains were characterized physiologically and tested for performance in plant growth experiments.

Based on our results, specific mechanisms to explain the observed phenotypic differences with the parental strain is presented.

In addition, this evolution experiments have supplied/contributed with a new *Bacillus* strain showing improved properties in plant growth promotion that are currently being tested as a formulated product in field trials.

DEPOSITS AND EXPERT SOLUTION

The applicant requests that a sample of the deposited microorganisms stated below may only be made available to an expert, subject to provisions governed by the Industrial Property Office, until the date on which the patent is granted.

The applicant deposited the *Bacillus paralicheniformis* parent strain as well as derived strains on May 8, 2019 at Deutsche Sammlung von Mikroorganismen und Zellkulturen GmbH, DSMZ, Inhoffenstr. 7B, D-38124 Braunschweig (DSMZ) and given the accession numbers:

*Bacillus paralicheniformis* parent strain=DSM 33110
*Bacillus paralicheniformis* CHCC31894=DSM 33111
*Bacillus paralicheniformis* CHCC31895=DSM 33112
*Bacillus paralicheniformis* CHCC31896=DSM 33113
*Bacillus paralicheniformis* CHCC31897=DSM 33114
*Bacillus paralicheniformis* CHCC31898=DSM 33115
*Bacillus paralicheniformis* CHCC31899=DSM 33116
*Bacillus paralicheniformis* CHCC31900=DSM 33117

The applicant deposited the *Bacillus subtilis* strain on Jun. 8, 2016 at Deutsche Sammlung von Mikroorganismen und Zellkulturen GmbH, DSMZ, Inhoffenstr. 7B, D-38124 Braunschweig and given the accession number: DSM32324.

The deposits were made according to the Budapest treaty on the international recognition of the deposit of microorganisms for the purposes of patent procedure.

SEQUENCES

Forming part of present description is the sequence listing attached hereto.

As specified therein, the sequences
SEQ ID NO:1 defines the PdeH coding sequence.
SEQ ID NO:2 defines the PdeH protein.
SEQ ID NO:3 or 7 defines the OppA coding sequence.
SEQ ID NO:4 or 8 defines the OppA protein.
SEQ ID NO:5 defines the GntR coding sequence.
SEQ ID NO:6 defines the GntR protein.

SEQ ID NO: 1 defines the PdeH coding sequence
ATGAGGGTATTCGTTGCCAGACAGCCAATATTCAACAGAAAAGAACAAGTTGTCGCATACGAGCTTT
TATACAGAGAAAGCGAGAAAAACTTTTTTTCCGGTATTGACGGTGATCAAGCGACAACAGAATTGAT
GATTAACAGCTTTTTAAACATTGGAATCGATAAATTGACAGAAGGCAAAAGGTATTACGTGAATTTT
ACCGAAGGTCTTTTTGGCATCAGGGCTGCCGACTTATTTTGATCCGGACCAGCTCGTTGTAGAAATCC
TTGAAGATGTGCCGATCACCCCTGAGCTTATCGAAAGGTGCAGGCATTTGAAAAGCCTCGGCTACAC
GATTGCCCTTGATGATTTTTGTTTAAAACATCGCGTGGAGAGGGACTTGCTCCATCAGCTTTTGGCA
TCCATTGATATTTTGAAGATCGATTTTTTCAAAACGACGCGGCAGGAAAGACAGAGCATCCTTCGAT
CATGCCGGAACCACCGTCTGACGTTTCTCGCTGAAAAAGTGGAGACGCGAAAGGATTATGAGCAGGC
GGCAAAAGACGGATTTCAACTGTTTCAAGGCTATTTCTTCAGCGAGCCCGCTGTGATTGACGGTCAG
GACATTACATATCATTTCCATGCTTACTATGAGCTGCTGCATGAATTAAGCGAAGATCAGCCTGATA
TTGAAAACGTCACAAATATTATAGAACGCGATTTGTCGCTTTCCTACCAGCTGCTGAAGCTGTTGAA
CTCTCCGGCCAACCGGCCGATTCAAAAGATTAAAAGCATCCGCCAGGCTATCGTGCTTCTCGGATTT
AAAGAAATCAAAAGGTGGATCTTCATCCTCTCATTTAAGGATTTAACGAAAAAACAAAACTCCAGCA
AGAACGAAGTCGTCAAGATTTCGCTGATCCGCGCGAAGCTTTGCGAATTGCTGGCGAAAAAAACGAA
TCGCCCTCAGCCGGCTTCTTATATGCTGACAGGCATGTTTTCATTTATCGATACACTGCTTCACAAA
GAACTGGCGGAAGTCATCAGCGAACTGCCGCTGACGGACGAAGTAGGACAAGCACTGCTCGGCAAAG
AAAACGATTATCGAAAAATCTTACGGCTTGCAAAATCGATCGAGCGAAACGAATGGGAAGACAGCAC
GCCAGAAACAGAAGGCTTAACAAAAGATGAAGCGTATCAATGCTATCTTGAAGCCGTTGAT SEQ ID NO: 2 defines the PdeH protein
MRVFVARQPIFNRKEQVVAYELLYRESEKNFFSGIDGDQATTELMINSFLNIGIDKLTEGKRYYVNF
TEGLLASGLPTYFDPDQLVVEILEDVPITPELIERCRHLKSLGYTIALDDFCLKHRVERDLLHQLLA
SIDILKIDFFKTTRQERQSILRSCRNHRLTFLAEKVETRKDYEQAAKDGFQLFQGYFFSEPAVIDGQ
DITYHFHAYYELLHELSEDQPDIENVTNIIERDLSLSYQLLKLLNSPANRPIQKIKSIRQAIVLLGF
KEIKRWIFILSFKDLTKKQNSSKNEVVKISLIRAKLCELLAKKTNRPQPASYMLTGMFSFIDTLLHK
ELAEVISELPLTDEVGQALLGKENDYRKILRLAKSIERNEWEDSTPETEGLTKDEAYQCYLEAVDWC
QKLL SEQ ID NO: 3 defines the OppA coding sequence
ATGAATAAACGCAAAACAGGATTTTCAATTTTAAGCTTGCTGCTGATCTTATCGATTTTTCTAACGGCCT
GCAACAGCGGCGAAGTCGGAGGGGACGAAAAGGAAGGCAAATCTGACGGGAAGCCGCAGCAGGGCGGGGA
TCTGATTGCTGGATCCACAGGTGAACCGACGCTGTTTAATTCACTGTATTCAACTGATACAGCAAGTTCA
GATATTGAAAGACTGATCTACAACACTTTGTTAGACGTTAATGAGAAACTTGAAGTGGAGAACCAGCTTG
CTGAGGAAGTAAAAGAATCGGAAGATGGTTTAACATTTGATGTTAAGCTCAAGGAAGGCGTCAAGTTTCA
TGACGGTGAAGAAATGACAGCTGATGATGTTGTATTTACTTACAGCATTCCGATGAGTGATGACTACGTC
GGGAGAACGCGGCTCGAACTTTAAAATGATAGAGTCTGTCACGAAAAAAGGTAAATATGAAGTACAGTTTA
AATTAAAGAAGCCTGATCCGTATTTTTACAATGTTACACTTGCCAGTTACGGTATTCTGCCTAAGCACAT
TTTAAAAGATGTCCCAATCAGCAAACTCGGTGAACACGAATTCAATCGAAAGAAATCCGATTGGAACAGGA
CCGTTTAAATTTAAAGAATGGAAAGAAGGACAATATGTAAAGGTTGAGGCTTTTGATGATTATTATGCCG
GGCGTCCTCATTTAGATTCGATCACGTATAAAATTATTCCGGATTCAAATGCAGCGCTGTCACAGCTGCA
AGCTGGAGATGTCGATTACTTGGTCGTTACACCAGGACCAGACTATAAAACGGCCGAGAAATTTAACAAT
GTGAAGATGGAAACCGATTTAGGTTTGAATTATACGTATATCGGCTGGAACGAAAGAAATGAGCTGTTTA
AGGATAAAAAGGTTCGCCAAGCGCTGACACATGCGCTTGACCGCCAGGCGCTCGTTGACCAAGTTCTAGA
TGGAGATGGGGAAATCGCGAACATCCCGGAAAGCCCGCTTTCATGGAACTATCCGGATAACAAAGATAAG
TTTAAAACGTTTGAATACGATCCAGAGAAAGCAAAAAAACTGCTCAAAGAAGCTGGATGGACAGACTCAG
ATGGTGATGGGATTTTAGATAAGGACGGCAAAAAGTTTTCTTTCGTTATTAAAACGAACCAAGGAAACAA
AACACGTGAAGACCTCGCGGTTGTTGTTCAGCAACAATTAAAAGAAATTGGTATTCAAGCAAAACCGCAG
ATTGTTGAATGGAGTGCTTTAATTGAACAAATGAATCCGCCGAATTGGGATTTTGATGCGATGATCATGG
GCTGGAGCCTTGCTACGTTCCCTGATCAGAGCAACATTTTCCATTCGAAAGAAGCTGAAAAAGGACTAAA
CTATGTTTGGTATCAAAATAAAAAGCTTGATAAATTGCTGGATGAAGCTAAAACGTTGAAGGATCGTGAA
GAATATAAAAAGGCGTATGAAGATATTTACGAAATTCTGGCGGAAGATCAGCCATATACATTCTTGTATT
ATACGAACTACCATAGAGCGATGCCAAAAAATATGAAAGGTTACGTCTTCCATCCGAAAGAAGATTTCTA
TAAAGCCGAAGACTGGTGGCTGGATCAAAAATAA SEQ ID NO: 4 defines the OppA protein
MNKRKTGFSILSLLLILSIFLTACNSGEVGGDEKEGKSDGKPQQGGDLIAGSTGEPTLFNSLYS
TDIASSDIERLIYNTLLDVNEKLEVENQLAEEVKESEDGLTFDVKLKEGVKFHDGEEMTADDVV
FTYSIPMSDDYVGERGSNFKMIESVTKKGKYEVQFKLKKPDPYFYNVTLASYGILPKHILKDVP
ISKLGEHEFNRKNPIGTGPFKFKEWKEGQYVKVEAFDDYYAGRPHLDSITYKIIPDSNAALSQL
QAGDVDYLVVTPGPDYKTAEKFNNVKMETDLGLNYTYIGWNERNELFKDKKVRQALTHALDRQA
LVDQVLDGDGEIANIPESPLSWNYPDNKDKFKTFEYDPEKAKKLLKEAGWTDSDGDGILDKDGK
KFSFVIKTNQGNKTREDLAVVVQQQLKEIGIQAKPQIVEWSALIEQMNPPNWDFDAMIMGWSLA
TFPDQSNIFHSKEAEKGLNYVWYQNKKLDKLLDEAKTLKDREEYKKAYEDIYEILAEDQPYTFL
YYTNYHRAMPKNMKGYVFHPKEDFYKAEDWWLDQK SEQ ID NO: 5 defines the GntR coding sequence
ATGCCAGTCAATTCGTTTGACAACTATCCAATGTCTTGGAAACCTGATAAGAAAGCATTGAAGC
GTCCTTATTATTATTCGATTGCGACATTGCTTGAAGAGGATATCGTAAACGGTTTTTTGGCGCC
TGGGACAAAGCTGCCTCCGCAACGGGAACTGGCAGATTTTCTTGATTTAAACTTTACCACGATT
ACACGCGCCTACAAACTATGTGAGTTCAAGGGGCTGATTTATGCTGTCACCGGAAGCGGCACCT
TCGTCGCTCCTAATGCTGCCCGCTCTATCACCATTTCCGCAGATAAGGTGACAAACTGCATTGA
TCTCGGATTTGTAGCCTCTTTTGAGCAAACCAACGGAATGGTAGCGGAGGTTGITCAAAAAGCT
GCAGATAAAGCTATTTGGAGAAGCTAATGGACTACAATGACCCGACTGGTATTCCGCATCAAA
AAACGGCAGGGCTAAACTGGATGGAATCTTTCGGTATTCACGCAGACCAAGAACATATTGCGAT
TGTTTCCGGTGCTCAAAATGCGTTGGCCATTGCATTGACCTCGCTGTTTGACCCTGGTGACCGC
ATTGCAACTGACCTATACACGTATTCGAACTTTATTGAGCTGGCCAAAATGCTCCATATTCAAT
TGGTACCTGTTTCCGGTGACCAGTATGGAATGCTGCCGGATGAACTTGAAAGCAGTGCTGCCA
GACGAAAATTCACGGCATATTTCTGATGCCCTCATGCTGTAATCCGACAACCGTGATGATATCA
GATGTTCGAAAGCATGAATTAGTGGAGGCCATCCGCAAGCATGATTTGCTGTTGATCGAGGATG
ATATTCATGCGTTTCTGACGGCAGGGATTGTATCAGATTATCAGCAGCCAATGTTTAGTTTGCT

```
TCCAGATCAGAGCATATACATTTGCAGCACCTCAAAGTCGATATGCTCCGGGTTAAGAGTTGCC
TATATGGTGTATGGGGATGCTTTACGGGAAAAGATATTGCAGGGCATTTTTAACATCAATGTCA
AAACGTCATCTTTAGATGCGGAGGTCATTACTGAGCTGATTTTATCAGGTAAGGCTCATGAAAT
CGTTGCTCAAAAGAAAAAGCTTGCACAGTCGGCCAATGATCTTTATGCGGCATATTTTCCTGTA
ACTGAGCCTGGTGAACATCCTCTTAGTTTATACCGATGGCTTCCGATTGAAGAGCATGCTGACT
CATCACAATTGGAGACGGATTTGAGGAAGCGTGGGATTCGGGTTTTTCATTCCGACCGTTTTCT
CAGCGGGCAGACGACGCGCGAAAAATATTTGCGCATTGCGCTTTCTTCTACAAATTCATTAGAT
GAGCTGAAATTAGGGTTGGATATATTAAAACAGTATCTCGGATAA

SEQ ID NO: 6 defines the GntR protein
MPVNSFDNYPMSWKPDKKALKRPYYYSIATLLEEDIVNGFLAPGTKLPPQRELADFLDLNFTTI
TRAYKLCEFKGLIYAVTGSGTFVAPNAARSITISADKVTNCIDLGFVASFEQTNGMVAEVVQKA
ADKSYLEKLMDYNDPTGIPHQKTAGLNWMESFGIHADQEHIAIVSGAQNALAIALTSLFDPGDR
IATDLYTYSNFIELAKMLHIQLVPVSGDQYGMLPDELEKQCCQTKIHGIFLMPSCCNPTTVMIS
DVRKHELVEAIRKHDLLLIEDDIHAFLTAGIVSDYQQPMFSLLPDQSIYICSTSKSICSGLRVA
YMVYGDALREKILQGIFNINVKTSSLDAEVITELILSGKAHEIVAQKKKLAQSANDLYAAYFPV
TEPGEHPLSLYRWLPIEEHADSSQLETDLRKRGIRVFHSDRFLSGQTTREKYLRIALSSINSLD
ELKLGLDILKQYLG SEQ ID NO: 7 defines the OppA coding sequence
TTGAAGAAGCGTTTGTCATTTATCAGTTTAATGCTCATTTTCACACTCGTCCTCAGCGCCTGCG
GCTTCGGCTCAAGCTCCGGTGACGGCGGTAAAAAAGACAGCAAAGGGAAAGACACATTAAATGT
CAACATTAAAACAGAACCGTTTTCACTACATCCGGGACTCGCAAACGATTCGGTGTCTGCAAAC
GTGCTTCGTCAGACTTTTGAAGGATTGACGACAATCGGTAAAGATGGAAAGCCGGTTGAAGCGG
CAGCCGAAAAATCGAAGTCAGCGACGACCAAAAAACATACACATTCACGCTCCGCGACGCGAA
ATGGTCAAATGGAGATCCTGTAACAGCAGAGGATTTTGAATACGCATGGAAATGGGCGCTCGAC
CCTAAAAACGAATCGCAATATGCGTATCAGCTTTACTACTTAAAAGGCGGAGAAGCAGCGAACA
CCGGCAAAGGGAAAATTGAAGATGTCGGCGTTAAAGCTGTTAATGATAAGACTTTAAAAGTCGA
GCTTGAAAAACCGACACCGTATTTTACTGAACTGACAGCATTCTACACATATATGCCAGTCAAT
AAAAAGGTAGCAGAGAAGAATGCGAAATGGTACACAAACGCAAAGTGAGAACTACGTATCTAACG
GACCTTTCAAAATGGCGAAATGGAAGCACAGCGGAAACATCGTACTGGAGAAAAACGACCAGTA
CTGGGATAAAGACGCTGTTAAGCTGAAGAAAATCAATATGGCGATGGTCAACGATCCGAACACT
GGTCTGAACATGTACAAAAAAGGCGAGCTAGACTTTGTAGGACAGCCGCTTGACCAGATTTCAA
CGGATGCGATTCCAAGCCTGAAAAAAGAAGGCCTGAACATTGATCCGTTCGCATCGGTTTACCT
GTACAAATTCAACACTGAAGCGGCTCCGCTGAACAATGTCAACATCCGTAAGGCGCTGACATAC
GCGATCAACCGCGAAGCGATCGTCAAAAACATCACGCAAGCGGAACAGCTGCCTGCGATGGGAT
TAGTGCCGCCGGCAGTCCACGGCTTTGAGTCAAATAAAGGCTATTTCAAAGACCATGATGTTGA
TAAGGCGAAAGAATACTTGGAAAAAGGTTTGAAAGAGCTCGGTTTGAAAAAAGCGTCAGACCTT
CCGAAAATCACGCTTTCCTTCAACACGGATGAAGCACACCAAAAAATCGCTCAAGCCGTTCAGG
AAATGTGGAACAAGGAACTGGGCTTAGATGTCGAATTAGGCAATGAAGAATGGAACGTATACAT
CGATAAGCTCCATGCAGGAAACTATCAAATCGGCCGTTTAGGCTGGACCGCCGACTTTAACGAC
GGAATGAACTTCCTTGAAACATACCGCGACAAAGAAGGCGGAAACAATGATACGAACTGGGAAA
ACGCAAAGTATAAAGAGCTGCTGAATAAAGCATCGAGAGAAACTGATTCAGCGAAACGCATCGA
GCTGATGAAAGAAGCAGAAAGCATCATCATGGATGAGCTGCCGGTTGCACCGATCTACTTCTAC
ACAATGCCGTATCTTCATGATGAAAGCTTAAAAGACTTTGTTCTAACTGGTACTGGTGAGATCT
ATTTCAAAACCGCGCATTTTGAATAA SEQ ID NO: 8 defines the OppA protein
MKKRLSFISLMLIFTLVLSACGFGSSSGDGGKKDSKGKDTLNVNIKTEPFSLHPGLANDSVSAN
VLRQTFEGLTTIGKDGKPVEAAAEKIEVSDDQKTYTFTLRDAKWSNGDPVTAEDFEYAWKWALD
PKNESQYAYQLYYLKGGEAANTGKGKIEDVGVKAVNDKTLKVELEKPTPYFTELTAFYTYMPVN
KKVAEKNAKWYTNADENYVSNGPFKMAKWKHSGNIVLEKNDQYWDKDAVKLKKINMAMVNDPNT
GLNMYKKGELDFVGQPLDQISTDAIPSLKKEGLNIDPFASVYLYKFNTEAAPLNNVNIRKALTY
AINREAIVKNITQAEQLPAMGLVPPAVHGFESNKGYFKDHDVDKAKEYLEKGLKELGLKKASDL
PKITLSFNTDEAHQKIAQAVQEMWNKELGLDVELGNEEWNVYIDKLHAGNYQIGRLGWTADFND
GMNFLETYRDKEGGNNDTNWENAKYKELLNKASRETDSAKRIELMKEAESIIMDELPVAPIYFY
TMPYLHDESLKDFVLTGTGEIYFKTAHFE
```

REFERENCES

Kampf J, Stülke J. (2017) Cyclic-di-GMP signalling meets extracellular polysaccharide synthesis in *Bacillus subtilis*. Environ Microbiol Rep. June; 9(3):182-185. doi: 10.1111/1758-2229.12530. Epub 2017 Apr. 3

Chen, Y., Chai, Y., Guo, J. H. and Losick, R. (2012) Evidence for cyclic Di-GMP-mediated signaling in *Bacillus subtilis*. *J Bacteriol*, 194, 5080-5090

Comella, N. and Grossman, A. D. (2005) Conservation of genes and processes controlled by the quorum response in bacteria: characterization of genes controlled by the quorum-sensing transcription factor ComA in *Bacillus subtilis*. Mol Microbiol, 57, 1159-1174

Stanley, N. R. and Lazazzera, B. A. (2005) Defining the genetic differences between wild and domestic strains of *Bacillus subtilis* that affect poly-gamma-dl-glutamic acid production and biofilm formation. Mol Microbiol, 57, 1143-1158

Romero, D., Aguilar, C., Losick, R. and Kolter, R. (2010) Amyloid fibers provide structural integrity to *Bacillus subtilis* biofilms. *Proc Natl Acad Sci USA*, 107, 2230-2234

Hsueh, Y. H., Huang, K. Y., Kunene, S. C. and Lee, T. Y. (2017) Poly-gamma-glutamic Acid Synthesis, Gene Regulation, Phylogenetic Relationships, and Role in Fermentation. Int J Mol Sci, 18

Yamaguchi, F., Ogawa, Y., Kikuchi, M., Yuasa, K. and Motai, H. (1996) Detection of gamma-Polyglutamic Acid (gamma-PGA) by SDS-Page. Biosci Biotechnol Biochem, 60, 255-258

EP 0705807
BR PI 0604602-9

Siddiqui and Mahmood (1999). Bioresource Technology 69; 167-179

The invention claimed is:

1. A *Bacillus paralicheniformis* strain having a mutation in one or more genes selected from pdeH, oppA, and gntR relative to the corresponding gene(s) of *Bacillus paralicheniformis* DSM 33110, wherein the strain is selected from the strains deposited at DSMZ under accession numbers DSM 33111, DSM 33112, DSM 33113, DSM 33114, DSM 33115, DSM 33116, and DSM 33117.

2. A *Bacillus paralicheniformis* strain according to claim 1, wherein the strain exhibits increased pellicle biofilm formation as compared to DSM 33110.

3. A *Bacillus paralicheniformis* strain according to claim 1, wherein the strain is derived from DSM 33110.

4. A *Bacillus paralicheniformis* strain according to claim 1, wherein the genome of the strain is at least 99% identical to the genome of DSM 33110.

5. A *Bacillus paralicheniformis* strain according to claim 1, wherein the mutation renders a protein encoded by the mutated gene dysfunctional.

6. A *Bacillus paralicheniformis* strain according to claim 1, wherein the mutation is selected from a mutation that causes a frameshift, a mutation that introduces a stop codon, and a mutation that inhibits substrate binding of a protein encoded by the mutated gene.

7. A *Bacillus paralicheniformis* strain according to claim 1, wherein the mutation is selected from a deletion, a substitution, and an insertion.

8. A *Bacillus paralicheniformis* strain according to claim 1, wherein the gntR gene or closest ortholog thereto exhibits from 95% to less than 100% sequence identity to SEQ ID NO:5.

9. A *Bacillus paralicheniformis* strain according to claim 1, wherein the oppA gene or closest ortholog thereto exhibits from 95% to less than 100% sequence identity to a sequence selected from SEQ ID NO:3 and SEQ ID NO:7.

10. A *Bacillus paralicheniformis* strain according to claim 1, wherein the pdeH gene or closest ortholog thereto exhibits from 95% to less than 100% sequence identity to SEQ ID NO:1.

11. A *Bacillus paralicheniformis* strain according to claim 1, wherein the strain is DSM 33113.

12. A composition comprising a mutant *Bacillus paralicheniformis* strain according to claim 1 and an agrochemically acceptable carrier or excipient.

13. The composition of claim 12, further comprising one or more compounds selected from microbial insecticides, biological insecticides, chemical insecticides, fungicides, nematicides, bactericides, herbicides, plant extracts, plant growth regulators, fertilizers, surfactants, dispersants, and yeast extracts.

14. The composition of claim 12, wherein the composition further comprises a *Bacillus subtilis* strain deposited at the DSMZ under accession number DSM 32324.

15. A plant seed coated with a composition according to claim 12, in an amount effective to achieve one or both of (i) benefit to plant growth and (ii) protection against pathogenic infection in a susceptible plant.

16. The coated plant seed of claim 15, comprising from about $1.0 \times 10^2$ CFU/seed to about $1.0 \times 10^9$ CFU/seed of the mutant *Bacillus* strain.

17. The coated plant seed of claim 16, wherein the coating composition further comprises one or more compounds selected from microbial insecticides, biological insecticides, chemical insecticides, fungicides, nematicides, bactericides, herbicides, plant extracts, plant growth regulators, fertilizers, surfactants, dispersants, and yeast extracts.

18. A method of promoting plant growth or plant health, inhibiting plant disease, or controlling plant pests, comprising applying an effective amount of a mutant *Bacillus paralicheniformis* strain of claim 1 to a plant, plant seed, or plant habitat.

19. A method of enhancing plant resistance to nematodes, comprising applying an effective amount of a mutant *Bacillus paralicheniformis* strain of claim 1 to a plant, plant seed, or plant habitat.

20. The method of claim 19, wherein the nematodes are of one or more genus selected from *Meloidogyne, Pratylenchus, Heterodera, Globodera, Ditylenchus, Tylenchulus, Xiphinema, Radopholus, Rotylenchulus, Helicotylenchus* and *Belonolaimus*.

21. The method of claim 19, wherein the nematodes are of one or more species selected from *Meloidogyne incognita, Meloidogyne javanica, Meloidogyne exigua, Meloidogyne paranaensis, Heterodera glycines*, and *Pratylenchus zeae*.

22. The method of claim 19, wherein the plant is selected from corn, rice, sugar cane, soybean, potato, carrot, coffee and banana.

23. A composition comprising *Bacillus paralicheniformis* DSM 33113 and *Bacillus subtilis* DSM 32324 in an agrochemically acceptable carrier or excipient.

* * * * *